US012467736B2

(12) United States Patent
Kamo

(10) Patent No.: US 12,467,736 B2
(45) Date of Patent: Nov. 11, 2025

(54) SIGNAL PROCESSING DEVICE, OCT DEVICE, SIGNAL PROCESSING METHOD, AND PROGRAM

(71) Applicant: Tomey Corporation, Nagoya (JP)

(72) Inventor: Takashi Kamo, Nagoya (JP)

(73) Assignee: Tomey Corporation, Nagoya (JP)

( * ) Notice: Subject to any disclaimer, the term of this patent is extended or adjusted under 35 U.S.C. 154(b) by 218 days.

(21) Appl. No.: 18/362,400

(22) Filed: Jul. 31, 2023

(65) Prior Publication Data

US 2024/0053137 A1    Feb. 15, 2024

(30) Foreign Application Priority Data

Aug. 3, 2022   (JP) ................................ 2022-124184

(51) Int. Cl.
  *G01B 9/02091*   (2022.01)
  *A61B 3/10*   (2006.01)
  *G01B 9/02015*   (2022.01)
  *G06T 11/00*   (2006.01)

(52) U.S. Cl.
  CPC .......... *G01B 9/02091* (2013.01); *A61B 3/102* (2013.01); *G01B 9/02028* (2013.01);
  (Continued)

(58) Field of Classification Search
  CPC ............ G01B 9/02091; G01B 9/02028; G01B 2290/20; A61B 3/102; G06T 11/005; G06T 2211/456
  See application file for complete search history.

(56) References Cited

U.S. PATENT DOCUMENTS

| 2012/0120485 A1* | 5/2012 | Ootomo | ............. G02B 21/0016 |
| | | | 356/498 |
| 2015/0345931 A1* | 12/2015 | Takada | ............... G01B 9/02004 |
| | | | 600/479 |

(Continued)

FOREIGN PATENT DOCUMENTS

JP    2018-514251 A    6/2018

OTHER PUBLICATIONS

Wang, Ling, et al. "Highly reproducible swept-source, dispersion-encoded full-range biometry and imaging of the mouse eye." Journal of Biomedical Optics 15.4 (2010): 046004-046004 (Year: 2010).*

(Continued)

*Primary Examiner* — Dominic J Bologna
(74) *Attorney, Agent, or Firm* — Studebaker Brackett PLLC

(57) ABSTRACT

A signal processing device includes a controller which acquires an output signal output from a single light receiver that receives a plurality of interference beams in which a light beam that is output from a single light source and traces a sample arm toward a measurement target and a light beam that is output from the light source and traces a reference arm that is different from the sample arm interfere with each other, the plurality of interference beams each having a different wavelength dispersion characteristic difference between the sample arm and the reference arm traced by the light beams interfering with each other; and extracts an extraction signal that is a signal for each of the interference beams on the basis of the output signal acquired and a correction signal obtained by applying wavelength dispersion correction processing to the output signal.

16 Claims, 17 Drawing Sheets

(52) U.S. Cl.
CPC ........ *G06T 11/005* (2013.01); *G01B 2290/20* (2013.01); *G06T 2211/456* (2023.08)

(56) References Cited

U.S. PATENT DOCUMENTS

2016/0278629 A1* 9/2016 Schuele .............. A61B 3/1225
2016/0298953 A1* 10/2016 Buckland .............. A61B 3/102

OTHER PUBLICATIONS

The extended European search report issued by the European Patent Office on Nov. 22, 2023, which corresponds to European European Patent Application No. 23187169.0-1001 and is related to U.S. Appl. No. 18/362,400.

Wang Ling et al., "Highly reproducible swept-source, dispersion-encoded full-range biometry and imaging of the mouse eye", Journal of Biomedical Optics, vol. 15, No. 4, pp. 046004-1 to 046004-6, Jan. 1, 2010, doi: 10.1117/1.3463480.

Felix Kottig et al.; "An advanced algorithm for dispersion encoded full range frequency domain optical coherence tomography"; Optics Express; vol. 20, No. 22; Oct. 22, 2012; Optical Society of America; pp. 24925-24948.

Barry Cense et al.; "Ultrahigh-resolution high-speed retinal imaging using spectral-domain optical coherence tomography"; Optics Express; vol. 12, No. 11; May 31, 2004; Optical Society of America; pp. 2435-2447.

* cited by examiner

Fig. 6
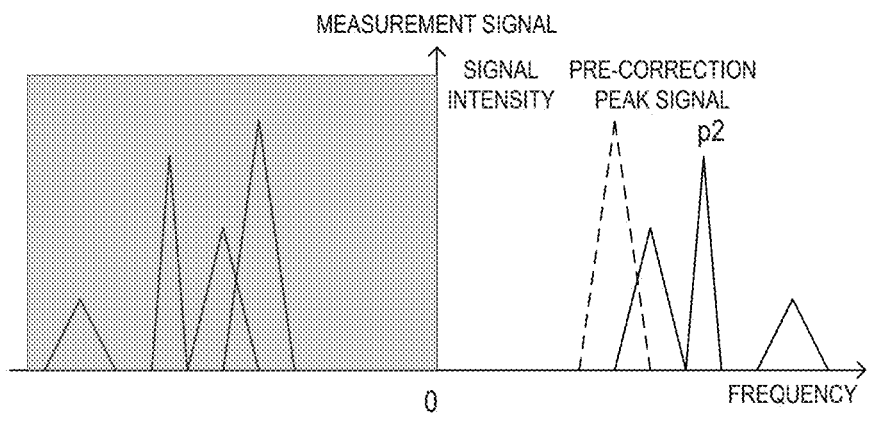
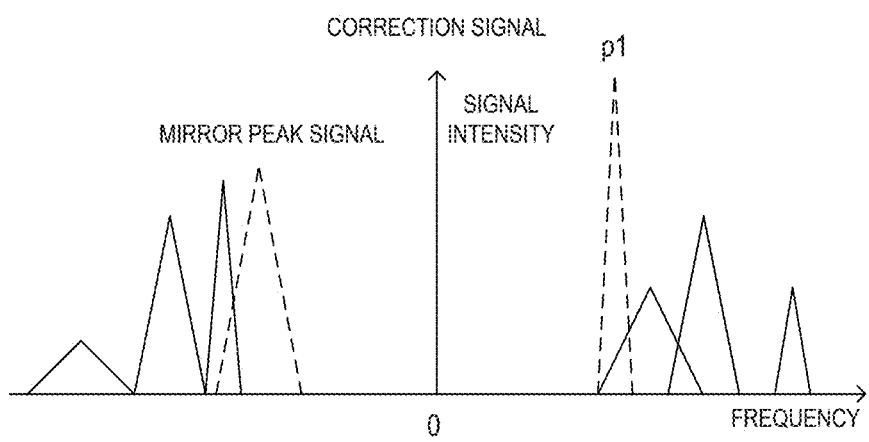

Fig. 7
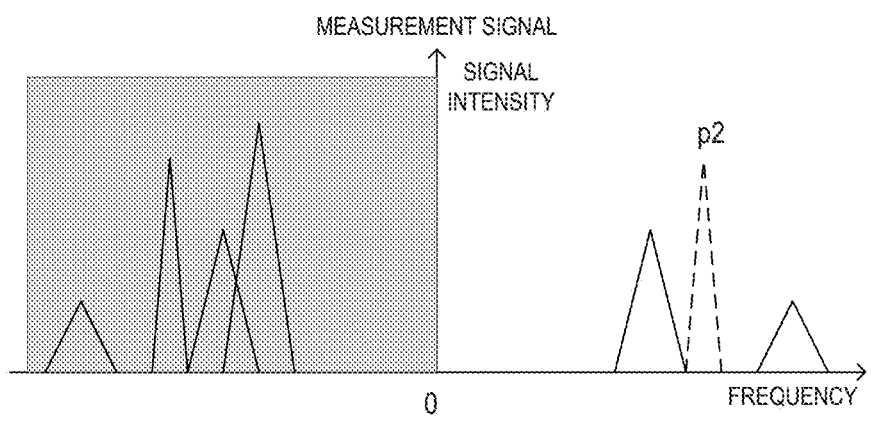
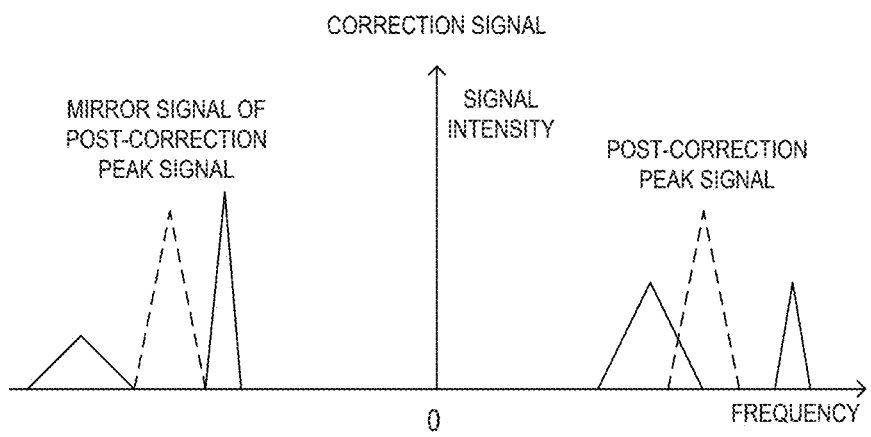

Fig. 8
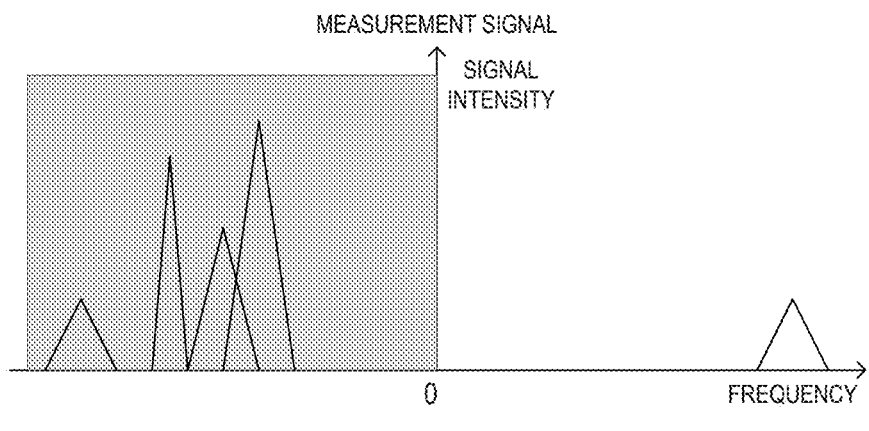
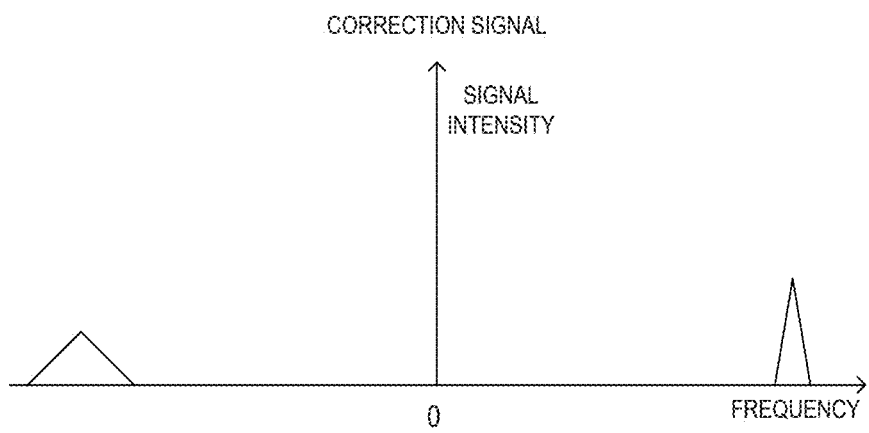

Fig. 9
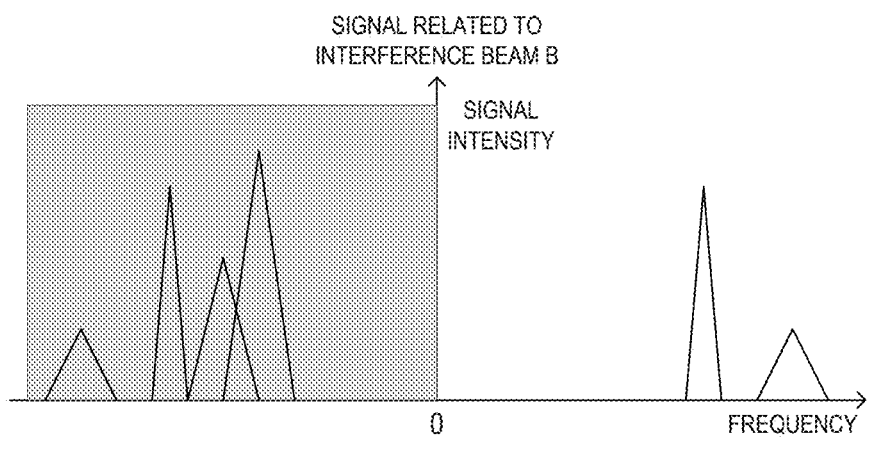
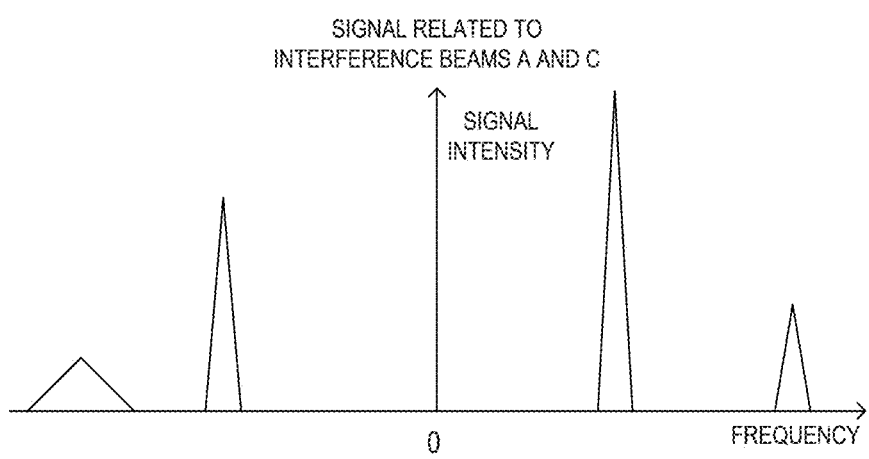

Fig. 17
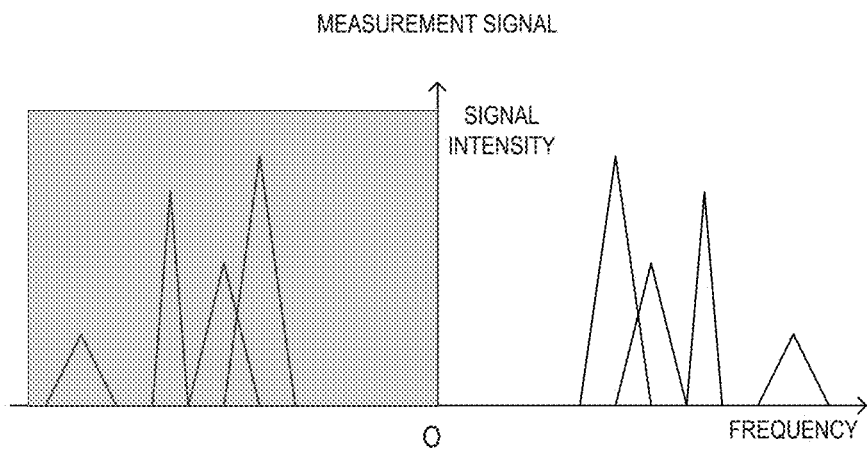
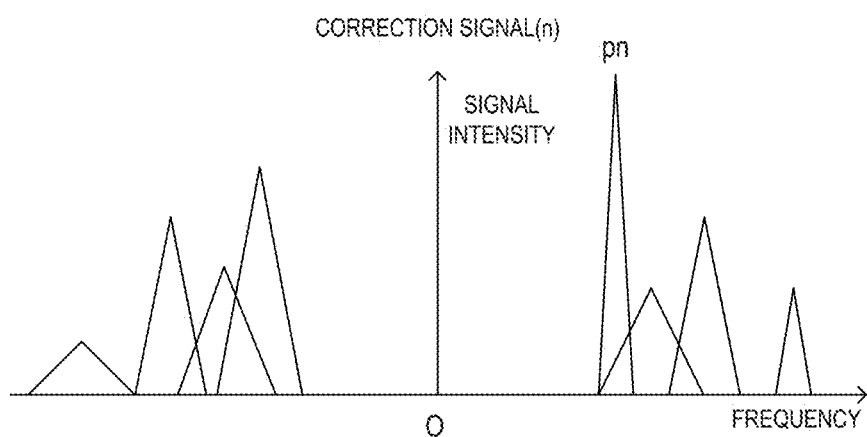
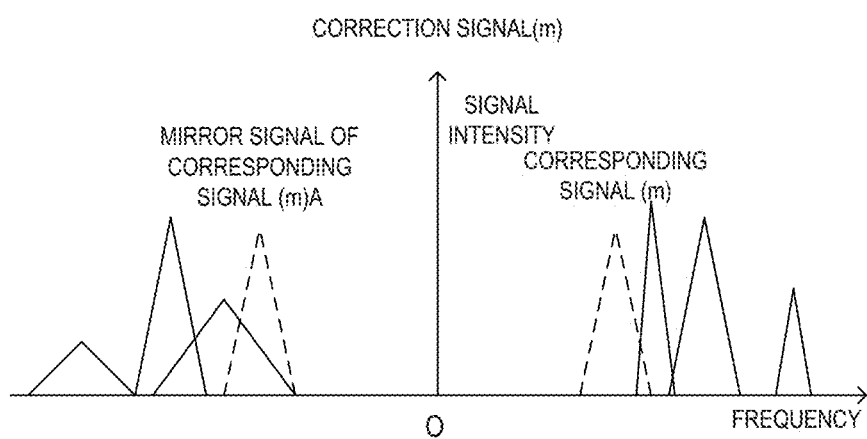

SIGNAL PROCESSING DEVICE, OCT DEVICE, SIGNAL PROCESSING METHOD, AND PROGRAM

CROSS-REFERENCE TO RELATED APPLICATION

This application claims benefit of priority to Japanese Patent Application No. 2022-124184, filed Aug. 3, 2022, the entire content of which is incorporated herein by reference.

BACKGROUND

Technical Field

The present disclosure relates to a signal processing device, an OCT device, a signal processing method, and a program.

Background Art

Optical coherence tomography (OCT) is known as a technique for measuring a position of a measurement target by utilizing optical coherence. There is a method for OCT called Fourier domain OCT (FD-OCT). In FD-OCT, there is a technique of extracting signals at a plurality of positions of a measurement target from a signal obtained by one measurement. Japanese Translation of PCT Application No. 2018-514251 discloses an OCT system for imaging a plurality of depth positions.

SUMMARY

In the conventional art, there has been necessity to adjust a dispersion characteristic of each of a plurality of optical paths traced by a reference beam to match a dispersion characteristic of a corresponding optical path traced by a measurement beam, and this adjustment has taken time and effort.

The present disclosure has been made in view of such problems, and the present embodiments can more easily extract signals than before at a plurality of positions of a measurement target from a signal obtained by one measurement in FD-OCT.

A signal processing device includes an acquisition unit that acquires an output signal output from a single light receiving unit that receives a plurality of interference beams in which a light beam that is output from a single light source and traces a sample arm toward a measurement target and a light beam that is output from the light source and traces a reference arm that is different from the sample arm interfere with each other. The plurality of interference beams each have a different wavelength dispersion characteristic difference between the sample arm and the reference arm traced by the light beams interfering with each other. The signal processing device further includes an extraction unit that extracts an extraction signal that is a signal for each of the interference beams on the basis of the output signal acquired by the acquisition unit and a correction signal obtained by applying wavelength dispersion correction processing to the output signal.

That is, in the signal processing device, a signal for each interference beam is extracted, from an output signal that is a signal of a plurality of interference beams having different wavelength dispersions, and a correction signal obtained by applying the wavelength dispersion correction processing, using a characteristic of a change generated in the signal by wavelength dispersion correction. As a result, it is possible to measure a plurality of positions together more easily without taking time and effort to match the wavelength dispersion characteristics of the corresponding sample arm and the reference arm.

BRIEF DESCRIPTION OF THE DRAWINGS

FIG. 6 is a diagram illustrating an example of the measurement signal and the correction signal;

FIG. 7 is a diagram illustrating an example of the measurement signal and the correction signal;

FIG. 8 is a diagram illustrating an example of the measurement signal and the correction signal;

FIG. 9 is a diagram illustrating an example of the measurement signal and the correction signal;

FIG. 17 is a diagram illustrating an example of the correction signal.

DETAILED DESCRIPTION

Hereinafter, an example of embodiments of the present disclosure will be described in the following order.

Figure 1:
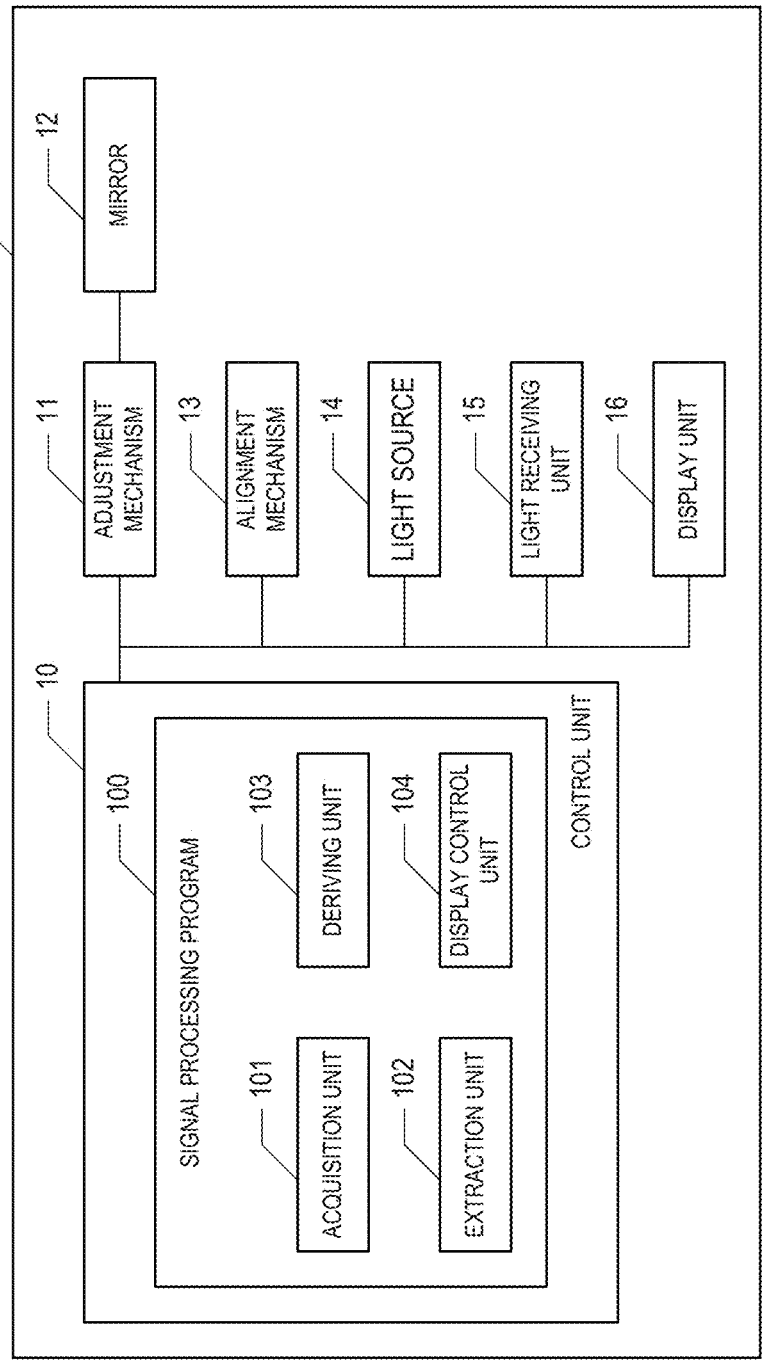
FIG. 1 is a diagram illustrating a configuration of an FD-OCT device according to an embodiment of the present disclosure.
Figure 2:
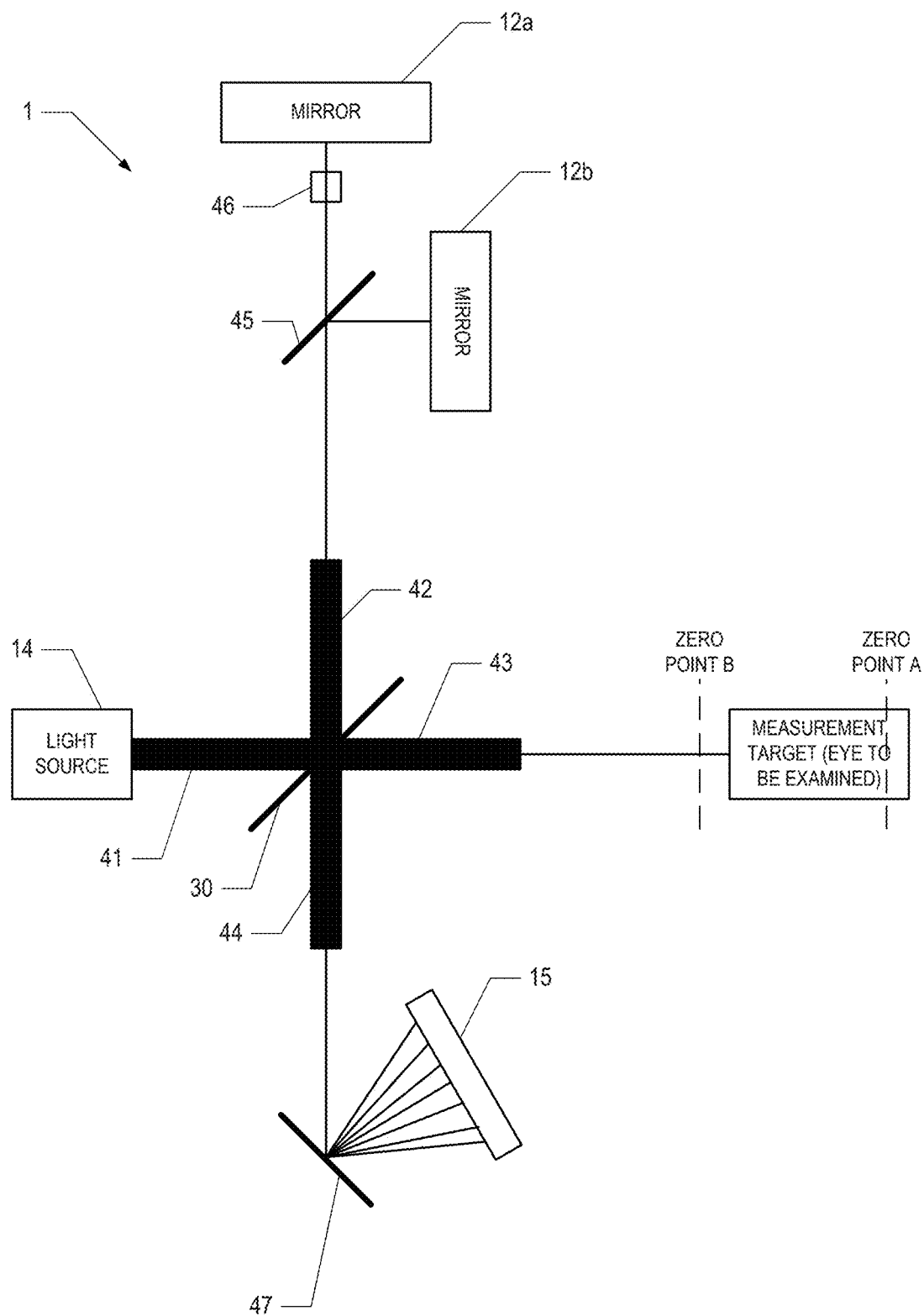
FIG. 2 is a diagram illustrating a configuration of the FD-OCT device according to the embodiment of the present disclosure.

(1) First Embodiment:
   (1-1) Configuration of FD-OCT Device:
   (1-2) Extraction Processing:
(2) Second Embodiment:
(3) Third Embodiment:
(4) Fourth Embodiment:
(5) Other Embodiments:

(1) First Embodiment (1-1) Configuration of FD-OCT Device:

Hereinafter, an FD-OCT device 1 according to the present embodiment will be described. The FD-OCT device 1 is an example of a signal processing device. The FD-OCT device 1 according to the present embodiment measures, assuming that a plurality of positions of an eyeball of a subject (hereinafter, an eye to be examined) is a measurement target, the positions as the measurement target by an FD-OCT method (in the present embodiment, an SD (Spectral-domain)-OCT method). In the present embodiment, the FD-OCT device 1 measures a plurality of positions of the eye to be examined (in the present embodiment, a cornea and a retina each are a measurement target, but other positions each may be a measurement target). FIGS. 1 and 2 each are a diagram illustrating a configuration of the FD-OCT device 1 according to the present embodiment. The FD-OCT device 1 includes a control unit 10, an adjustment mechanism 11, a mirror 12 (a mirror 12a, a mirror 12b), an alignment mechanism 13, a light source 14, a light receiving unit 15, and a display unit 16. Furthermore, the FD-OCT device 1 includes optical members (a branching part 30, transmission parts 41, 42, 43, 44, a half mirror 45, a wavelength dispersion member 46, and a diffraction grating 47) that forms an optical path of light output from the light source 14. In the present embodiment, the FD-OCT device 1 generates an interference beam by a Michelson interferometer from light output from the light source 14.

The control unit 10 includes a processor, a RAM, a ROM, and the like, and controls the FD-OCT device 1 by executing a program recorded in the ROM or the like. The adjustment mechanism 11 is a mechanism capable of moving the mirrors 12a and 12b in a linear direction along the optical path. In the present embodiment, the adjustment mechanism 11 is a ball screw mechanism that moves the mirrors 12a and 12b, but may be another mechanism, for example, a power transmission mechanism such as a slider crank mechanism or a cam. The mirrors 12a and 12b each reflect incident light. The control unit 10 adjusts positions of the mirrors 12a and 12b via the adjustment mechanism 11. The alignment mechanism 13 is a mechanism used for adjusting a positional relationship between the FD-OCT device 1 and the measurement target. Before the measurement of the measurement target by the FD-OCT, the control unit 10 detects a position of a corneal vertex of the eye to be examined of the subject via the alignment mechanism 13, and adjusts the position of the FD-OCT device 1 such that the detected position of the corneal vertex and the FD-OCT device 1 have a predetermined positional relationship. The light source 14 outputs light in a predetermined wavelength band in response to an instruction from the control unit 10. The light receiving unit 15 is a plurality of light receiving elements arranged linearly.

The branching part 30 is an optical member that causes a reference beam tracing an optical path for reference and a measurement beam emitted to the measurement target to branch from a light beam output from the light source 14, and is, for example, a filter coupler or the like. Hereinafter, the optical path of the reference beam is referred to as a reference arm. Hereinafter, an optical path of the measurement beam is referred to as a sample arm. In the present embodiment, the transmission part 41 is an optical fiber that transmits the light from the light source 14 to the branching part 30. The transmission part 42 is an optical fiber used for forming an optical path of the reference beam made to branch from the branching part 30. The reference beam made to branch by the branching part 30 passes through the transmission part 42 and travels toward the half mirror 45. The half mirror 45 allows, from the reference beam that has reached, light that passes through the wavelength dispersion member 46 and travels toward the mirror 12a, and light that travels toward the mirror 12b to branch. Hereinafter, an optical path of the reference beam traveling toward the mirror 12a is referred to as a reference arm A. Hereinafter, an optical path of the reference beam traveling toward the mirror 12b is referred to as a reference arm B. In addition, hereinafter, reference beams tracing the reference arms A and B are referred to as reference beams A and B, respectively. The reference arms A and B are examples of a first optical path and a second optical path, respectively. The wavelength dispersion member 46 is a dispersive medium, a pulse stretcher, or the like. As described above, in the present embodiment, a plurality of (two) reference arms having different wavelength dispersion characteristics are configured. In the present embodiment, the reference arm A has a longer optical path length than that of the reference arm B. That is, the reference beam A is used to measure a position in an inner direction of the measurement target as compared to the reference beam B. Here, the inner direction is a traveling direction of the measurement beam when being incident on the measurement target. A direction opposite to the inner direction is defined as a front direction. In the present embodiment, the control unit 10 moves the mirrors 12a and 12b via the adjustment mechanism 11 to adjust the optical path lengths of the reference arms A and B. Here, the optical path length is a length of a distance that light passes through a vacuum during a period in which light passes through an optical path in a corresponding medium. For example, the optical path length of an optical path having a length of 1 m in a medium having a refractive index of 1.2 is: 1.2 (refractive index of the medium)×1 m (length in the medium)=1.2 m. The reference beam having passed through the wavelength dispersion member 46 and reflected by the mirror 12a passes through the wavelength dispersion member 46 and the half mirror 45, traces the transmission part 42, and travels toward the branching part 30. The reference beam reflected by the mirror 12b travels toward the half mirror 45, is changed in direction by the half mirror 45, traces the transmission part 42, and travels toward the branching part 30. The transmission part 43 is an optical fiber used for forming an optical path through which the measurement beam made to branch by the branching part 30 travels toward the measurement target. Part of the measurement beam toward the measurement target travels toward the cornea of the measurement target, is partially reflected/scattered there, and returned in the direction in which the part has come. Part of the measurement beam toward the measurement target travels toward the retina of the measurement target, is partially reflected/scattered there, and returned in the direction in which the part has come. Hereinafter, an optical path of the measurement beam toward the retina is referred to as a sample arm A. Hereinafter, a measurement beam tracing the sample arm A is referred to as a measurement beam A. Hereinafter, an optical path of the measurement beam toward the cornea is referred to as a sample arm B. Hereinafter, a measurement beam tracing the sample arm B is referred to as a measurement beam B. In the present embodiment, the sample arms A and B coincide with each other until the sample arms A and B are incident on the eye to be examined Therefore, the measurement beams A and B reach the eye to be examined along the same optical axis. The measurement beams A and B returned from the measurement target pass through the transmission part 43 and travel toward the branching part 30. Zero points A and B in the sample arms in FIG. 2 are zero points of the reference arms A and B, respectively. The zero point is a position on a sample arm, and is a position at which the optical path length of the measurement beam in a case where the measurement beam is reflected back in the opposite direction at the position is the same as the optical path length of the reference arm. The zero point B is adjusted so as to be on a front side (an anterior side as viewed from the eye to be examined) of a cornea of the eye to be examined as a measurement target.

In the branching part 30, an interference beam between the reference beam A and the measurement beam A, an interference beam between the reference beam B and the measurement beam B, and an interference beam between the reference beam A and the reference beam B are generated. Hereinafter, the interference beam between the reference beam A and the measurement beam A is referred to as an interference beam A. Hereinafter, the interference beam between the reference beam B and the measurement beam B is referred to as an interference beam B. In the present embodiment, since the wavelength dispersion member 46 exists, the interference beam A and the interference beam B have different wavelength dispersion characteristic differences of the corresponding sample arm and reference arm. That is, the wavelength dispersion characteristic difference between the reference arm A and the sample arm A corresponding to the interference beam A is different from the wavelength dispersion characteristic difference between the reference arm B and the sample arm B corresponding to the interference beam B. Hereinafter, an interference beam between the reference beam A and the measurement beam B is referred to as an interference beam C. The interference beam C is an example of an interference reference beam. The transmission part 44 is an optical fiber that forms an optical path of light including each interference beam generated by the branching part 30. The light including each interference beam generated by the branching part 30 passes through the transmission part 44 and travels toward the diffraction grating 47. The diffraction grating 47 disperses the light that has reached. Then, the dispersed light reaches a lens (not illustrated) arranged between the diffraction grating 47 and the light receiving unit 15. This lens converges the light dispersed by the diffraction grating 47 on each light receiving element of the light receiving unit 15 for each wavelength component (wavenumber component). That is, light having different wavenumbers is received by respective light receiving elements of the light receiving unit 15.

The light traveling through the transmission part 44 is dispersed by the diffraction grating 47 to be divided for each wavelength component (wavenumber component) and converged on the light receiving unit 15. As a result, the control unit 10 can detect a signal current in accordance with the intensity of each wavelength component (wavenumber component) of the received light via the plurality of light receiving elements of the light receiving unit 15. However, the wavenumbers of the light received by the plurality of light receiving elements of the light receiving unit 15 are not at equal intervals. Therefore, the control unit 10 performs interpolation processing on the basis of the detected signal current to obtain signal currents corresponding to a plurality of wavenumber values at equal intervals. Hereinafter, the signal current corresponding to the plurality of wavenumber values at equal intervals is referred to as a measurement current signal. The control unit 10 converts a signal in a wavenumber-current space (hereinafter referred to as K space) into a signal in a frequency-signal intensity space (hereinafter referred to as Z space) by performing discrete Fourier transform on the measurement current signal. Hereinafter, the signal converted here is referred to as a measurement signal.

Figure 3A:
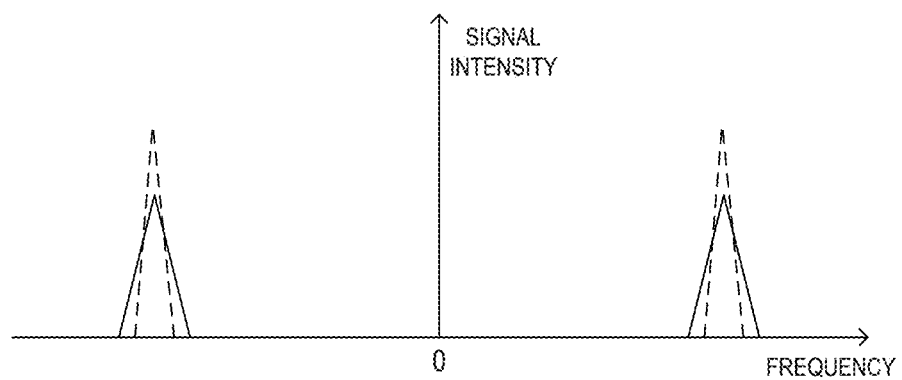
FIGS. 3A-3B are diagrams for explaining wavelength dispersion correction.

Here, a signal obtained by the conventional FD-OCT will be described. Conventionally, FD-OCT cannot distinguish signals from samples having an optical path length difference symmetric with respect to a zero point. That is, an interference beam between a measurement beam returned from a sample at a predetermined distance behind the zero point (on a back side as viewed from the eye to be examined) and a reference beam cannot be distinguished from an interference beam between a measurement beam returned from a sample at a predetermined distance before the zero point (on a front side as viewed from eye to be examined). In this case, by performing discrete Fourier transform on the current signal for the wavenumber obtained via the light receiving unit, a bilaterally symmetrical signal can be obtained on a positive side and a negative side of the frequency. An example of a signal obtained by the conventional FD-OCT is illustrated in a broken line graph in FIG. 3A. In FIG. 3A, it can be seen that peaks corresponding to the samples appear bilaterally symmetrically on the positive side and the negative side of the frequency. In this manner, a signal appearing in a frequency band where positive and negative are opposite to those of the original signal is referred to as a mirror signal. In such a case, for example, the measurement of the sample is performed by adjusting the zero point to be clearly on the front side or the back side of the sample and ignoring a signal in a direction in which the sample does not exist. Thus, only one of the front side or the back side of the zero point can be measured.

Therefore, there is a technology called full-range OCT in which signals on both positive and negative sides (in the full range) (signals on the back side and the front side of the zero point) are acquired by distinguishing a signal of a positive frequency from a signal of a negative frequency. In the full-range OCT, both sides of the zero point can be measured at once. The full-range OCT includes a technique called dispersion encoded full range (DEFR). For example, by providing a wavelength dispersion member like the wavelength dispersion member 46 in FIG. 2, or the like, the wavelength dispersion characteristics of the reference beam and the measurement beam can be made different. In this case, a signal in the Z space obtained by receiving the interference beam between the reference beam and the measurement beam by the light receiving unit becomes broad due to influence of a wavelength dispersion characteristic difference between the reference beam and the measurement beam. That is, the width of the peak of the signal is widened, and the signal intensity is lowered. A solid line graph in FIG. 3A indicates a signal in a case where a wavelength dispersion member is provided. It can be seen that the signal is broad when the reference beam and the measurement beam have different wavelength dispersion characteristics.

Here, by performing processing of correcting wavelength dispersion influence on the measurement current signal obtained through the light receiving unit, in the Z space after the discrete Fourier transform, a portion of the peak corresponding to the sample becomes sharp (the width becomes narrower and the signal intensity becomes higher), and portions of other peaks become broad. The following provides more detailed description.

In an interferometer of the OCT, a measurement current signal I obtained by interpolating a signal current output from the light receiving element in a case where a measurement beam and a reference beam that are interfering with each other are received by the light receiving element is expressed by the following Equation 1.

$$I = \frac{\eta q \lambda}{hc}\left(\overline{u_{sample}} + \overline{u_{reference}} + 2\sqrt{\overline{u_{sample}} \times \overline{u_{reference}}} \cos\frac{2\pi\Delta z}{\lambda}\right) = \quad \text{(Equation 1)}$$

$$\frac{\eta q \lambda}{hc}\left(\overline{u_{sample}} + \overline{u_{reference}} + 2\sqrt{\overline{u_{sample}} \times \overline{u_{reference}}} \cos k\Delta z\right)$$

$u_{sample}$ (hereinafter, described as $\overline{u}_{sample}$) and $u_{reference}$ (hereinafter, described as $\overline{u}_{reference}$) with an upper bar in Equation 1 are respective energies of the two beams interfering with each other. η is quantum efficiency of the light receiving unit (ratio of incident photons converted into electrons as signals among incident photons). h is Planck's constant. q is an elementary charge. λ is a wavelength of light. k is a wavenumber of light (reciprocal of the wavelength λ). Δz is a difference between optical path lengths of two light beams (measurement beam and reference beam) interfering with each other. In the third term of Equation 1, an influence due to light interference appears.

Here, if the wavelength dispersion member is arranged on the reference arm, Δz is expressed by the following Equation 2.

$$\Delta z = z_{sample} - z_{reference} = z_{sample} - z_{zero\text{-}dispersion} - \text{Ln}(k) \quad \text{(Equation 2)}$$

In Equation 2, $z_{sample}$ is an optical path length of the sample arm. $z_{reference}$ is an optical path length of the reference arm. $z_{zero\text{-}dispersion}$ is an optical path length (an optical path length of a portion excluding a portion of the wavelength dispersion member) of an optical path that can be regarded as approximately not having the wavelength dispersion characteristic in the reference arm. L is a length of the wavelength dispersion member in the optical path provided in the sample arm. n(k) is a refractive index of light having a wavenumber k in the wavelength dispersion member.

Phase φ of the measurement current signal I is expressed by the following Equation 3 as a function of the wavenumber k from an argument of cos of the third term of Equation 1.

$$\Phi(k) = k\Delta z = k(z_{sample} - z_{zero\ dispersion} - \text{Ln}(k)) \quad \text{(Equation 3)}$$

Furthermore, when n(k) of Equation 3 is Taylor expanded with respect to the wavenumber k on the basis of the predetermined wavenumber $k_0$, the following Equation 4 is obtained.

$$n(k) = n(k_0) + \frac{dn}{dk}\bigg|_{k=k_0}(k-k_0) + \quad \text{(Equation 4)}$$

$$\frac{1}{2!}\frac{d^2 n}{dk^2}\bigg|_{k=k_0}(k-k_0)^2 + \frac{1}{3!}\frac{d^3 n}{dk^3}\bigg|_{k=k_0}(k-k_0)^3 + \ldots$$

When Equation 4 is substituted into Equation 3, the following Equation 5 is obtained.

$$\Phi(k) = k\bigg(z_{sample} - z_{zero\text{-}dispersion} - \text{Ln}(k_0) - L\frac{dn}{dk}\bigg|_{k=k_0} \quad \text{(Equation 5)}$$

$$(k-k_0) - \frac{1}{2!}L\frac{d^2 n}{dk^2}\bigg|_{k=k_0}(k-k_0)^2 - \frac{1}{3!}L\frac{d^3 n}{dk^3}\bigg|_{k=k_0}$$

$$(k-k_0)^3 + \ldots\bigg) = \Phi_0 + \Delta z_0(k-k_0) -$$

-continued $$\sum_{j=2}^{\infty}\left(\frac{1}{(j-1)!}L\frac{d^{j-1}n}{dk^{j-1}}\bigg|_{k=k_0} + \frac{1}{j!}k_0 L\frac{d^j n}{dk^j}\bigg|_{k=k_0}\right)(k-k_0)^j$$

$\varphi_0$ in Equation 5 is expressed by the following Equation 6.

$$\varphi_0 = k_0(z_{sample} - z_{zero\text{-}dispersion} - \text{Ln}(k_0)) \quad \text{(Equation 6)}$$

$\Delta z_0$ in Equation 5 is expressed by the following Equation 7.

$$\Delta z_0 = z_{sample} - z_{zero\text{-}dispersion} - \text{Ln}(k_0) - k_0 L\frac{dn}{dk}\bigg|_{k=k_0} \quad \text{(Equation 7)}$$

The first term ($\varphi_0$) and the second term ($\Delta z_0(k-k_0)$) among the components of the phase φ of Equation 5 are a component proportional to k and a constant. Therefore, if the phase φ has only the first term and the second term as components, the measured current signal I has a sinusoidal shape as a function of the wavenumber k, and even if discrete Fourier transform is performed on the measurement current signal I, the peak signal is not disturbed. On the other hand, the third term of the phase φ in Equation 5 indicates the influence of the wavelength dispersion characteristic difference between the reference arm and the sample arm. With the presence of this third term, the measurement current signal I is no longer sinusoidal. As a result, in a case where discrete Fourier transform is performed on the measurement current signal I, the peak signal becomes broad.

When φ of Equation 5 is obtained, the obtained φ is approximated by a polynomial $\Sigma_{j=0}(a_j(k-k_0)^j)$ to obtain an approximate equation of Equation 5. Then, the information of the third term of Equation 5 is obtained by subtracting the components of the zeroth-order term and the first-order term from the polynomial. Here, as represents a coefficient of a j-order term. In addition, φ of Equation 5 may be approximated by a polynomial $\Sigma_{j=0}(a_j(k-k_0)^j)$, and components of second-order and subsequent terms may be regarded as information of the third term of Equation 5.

The third term of Equation 5 is set to a dimensionless value $\varphi_{dispersion}$ indicating the magnitude of wavelength dispersion. $\varphi_{dispersion}$ is expressed by the following Equation 8.

$$\Phi_{dispersion}(k) = -\sum_{j=2}^{\infty}\left(\frac{1}{(j-1)!}L\frac{d^{j-1}n}{dk^{j-1}}\bigg|_{k=k_0} + \quad \text{(Equation 8)}$$

$$\frac{1}{j!}k_0 L\frac{d^j n}{dk^j}\bigg|_{k=k_0}\right)(k-k_0)^j$$

The measurement current signal I is expressed by the following Equation 9 using $\varphi_{dispersion}$. The first term and the second term of Equation 9 are constant terms. The third term indicates an interference signal between the measurement beam and the reference beam having reached the sample and returned from the sample. The fourth term indicates a complex conjugate component (mirror signal) of the third term, and is a signal of a frequency band where positive and negative are opposite to those of the third term.

$$I = \frac{\eta q \lambda}{hc}\left(\overline{u_{sample}} + \overline{u_{reference}} + 2\sqrt{\overline{u_{sample}} \times \overline{u_{reference}}} \cos(\Phi_0 + \quad \text{(Equation 9)}$$

-continued $$\Delta z_0(k-k_0) + \Phi_{dispersion}(k)) = \frac{\eta q \lambda}{hc}(\overline{u_{sample}} + \overline{u_{reference}} +$$

$$\sqrt{\overline{u_{sample}} \times \overline{u_{reference}}} \exp(i(\Phi_0 + \Delta z_0(k-k_0) + \Phi_{dispersion}(k))) +$$

$$\sqrt{\overline{u_{sample}} \times \overline{u_{reference}}} \exp(-i(\Phi_0 + \Delta z_0(k-k_0) + \Phi_{dispersion}(k))))$$

By applying $\exp(-i\varphi_{dispersion})$ to the measurement current signal I, the wavelength dispersion influence can be corrected. When I is multiplied by $\exp(-i\varphi_{dispersion})$, the following Equation 10 is obtained.

$$I \times \exp(-i\Phi_{dispersion}) = \quad \text{(Equation 10)}$$

$$\frac{\eta q \lambda}{hc}(\overline{u_{sample}}\exp(-i\Phi_{dispersion}) + \overline{u_{reference}}\exp(-i\Phi_{dispersion}) +$$

$$\sqrt{\overline{u_{sample}} \times \overline{u_{reference}}} \exp(i(\Phi_0 + \Delta z_0(k-k_0))) +$$

$$\sqrt{\overline{u_{sample}} \times \overline{u_{reference}}} \exp(-i(\Phi_0 + \Delta z_0(k-k_0) + 2\Phi_{dispersion}(k))))$$

Since the first term and the second term of Equation 10 are constant terms caused by the measurement beam and the reference beam, the first term and the second term are ignored in the signal after the discrete Fourier transform. As can be seen from the third term of Equation 10, there is no $\varphi_{dispersion}$ that is in the third term of Equation 9. That is, in the third term, it can be seen that the wavelength dispersion influence is corrected. On the other hand, in the fourth term of Equation 10, $\varphi_{dispersion}$ is twice as large as that in the fourth term of Equation 9, and it can be seen that the wavelength dispersion influence is large.

Figure 3B:
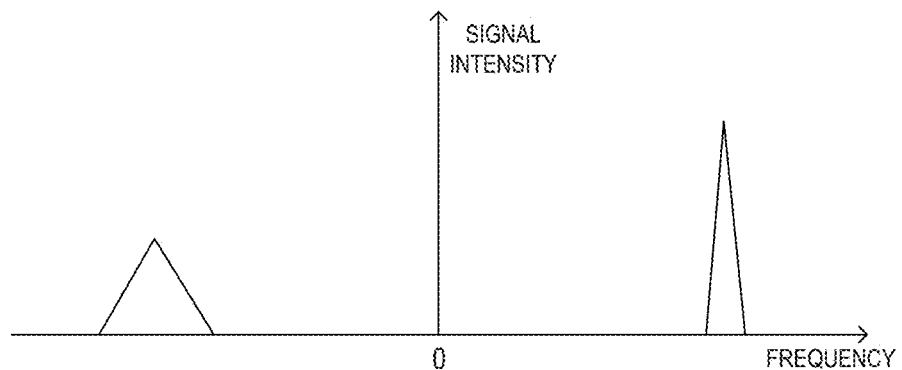

When discrete Fourier transform is performed on I to which exp(−iφ dispersion) is applied, in the Z space, a signal related to the third term of Equation 10 and a signal related to the fourth term in a frequency band where positive and negative are opposite to those of the signal related to the third term are generated. The signal related to the third term has a reduced wavelength dispersion influence and becomes sharp. The signal related to the fourth term has wavelength dispersion influence increased and becomes broad. That is, the signal of the interference beam related to the measurement beam from the sample is sharp, and the mirror signal is broad. By using such a feature, in the Z space, the signal of the sample and the mirror signal appearing bilaterally symmetrically can be distinguished. FIG. 3B illustrates a signal in a case where wavelength dispersion correction is performed on the signal indicated by the solid line graph in FIG. 3A. As compared with FIG. 3A, it can be seen that the peak on the positive frequency side is sharp and the peak on the negative frequency side is broad. From these appearances, it can be seen that the signal on the positive frequency side is a signal corresponding to the sample, and the signal on the negative frequency side is a mirror signal. In this manner, the full-range OCT is achieved by distinguishing between the real signal and the mirror signal. Note that, in the present embodiment, the FD-OCT device 1 performs full-range measurement (measurement on both sides across the zero point A) in the measurement using the interference beam A.

In a case where the measurement current signal I is not affected by the wavelength dispersion characteristic difference in the optical path, when wavelength dispersion correction by applying $\exp(-i\varphi_{dispersion})$ is performed, the signal after the discrete Fourier transform becomes broad on both the positive side and the negative side of the frequency.

A measurement current signal I of an interference beam between light beams tracing optical paths having the same wavelength dispersion characteristic is expressed by the following Equation 11.

$$I = \frac{\eta q \lambda}{hc}(\overline{u_{sample}} + \overline{u_{reference}} + \quad \text{(Equation 11)}$$

$$\sqrt{\overline{u_{sample}} \times \overline{u_{reference}}} \exp(i(\Phi_0 + \Delta z_0(k-k_0))) +$$

$$\sqrt{\overline{u_{sample}} \times \overline{u_{reference}}} \exp(-i(\Phi_0 + \Delta z_0(k-k_0)))$$

When wavelength dispersion correction in which the measurement current signal I is multiplied by $\exp(-i\varphi_{dispersion})$ is performed, the following Equation 12 is obtained.

$$I \times \exp(-i\Phi_{dispersion}) = \quad \text{(Equation 12)}$$

$$\frac{\eta q \lambda}{hc}(\overline{u_{sampler}}\exp(-i\Phi_{dispension}) + \overline{u_{reference}}\exp(-i\Phi_{dispersion}) +$$

$$\sqrt{\overline{u_{sample}} \times \overline{u_{reference}}} \exp(i(\Phi_0 + \Delta z_0(k-k_0) - \Phi_{dispersion}(k))) +$$

$$\sqrt{\overline{u_{sample}} \times \overline{u_{reference}}} \exp(-i(\Phi_0 + \Delta z_0(k-k_0) - \Phi_{dispersion}(k)))$$

Figure 4A:
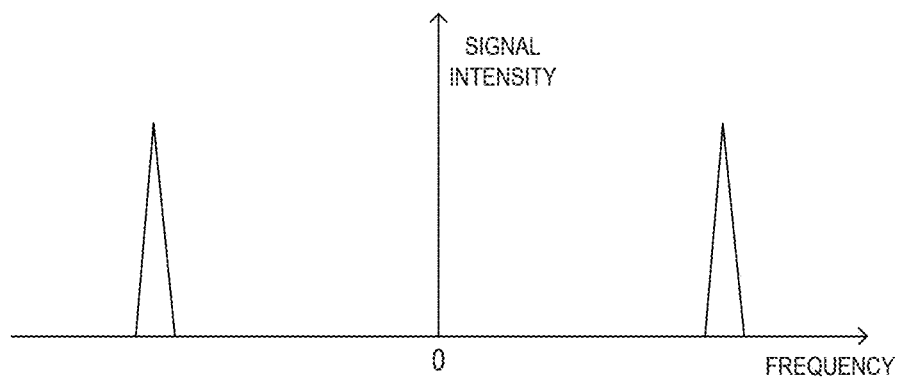
FIGS. 4A-4B are diagrams for explaining wavelength dispersion correction.
Figure 4B:
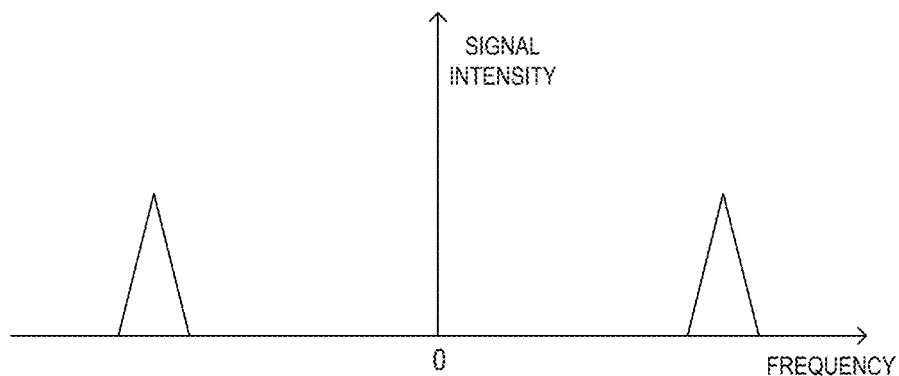

As can be seen from the third term and fourth terms of Equation 12, much effect of $\varphi_{dispersion}$ occurs as compared to the third and fourth terms of Equation 11. Therefore, when the wavelength dispersion correction is performed on the measurement current signal I of the interference beam between the light beams tracing the optical paths having the same wavelength dispersion characteristic, the signal in the Z space becomes broad. The graph of FIG. 4A illustrates an example of a signal obtained by interference beam that has no wavelength dispersion influence in FD-OCT. It can be seen that the signal is sharp in frequency bands on both the positive and negative sides. In addition, FIG. 4B illustrates a signal obtained by performing correction of the wavelength dispersion influence $\varphi_{dispersion}$ on the signal of FIG. 4A. It can be seen that the signal is broad in the frequency bands on both the positive and negative sides.

In the present embodiment, the control unit 10 extracts a signal related to each interference beam from the measurement signal using such a characteristic. Hereinafter, details of functions and processing of the FD-OCT device 1 will be described.

The control unit 10 functions as an acquisition unit 101, an extraction unit 102, a deriving unit 103, and a display control unit 104 by executing a signal processing program 100 stored in the ROM. Therefore, in the following description, processing using each functional component as a subject is actually processing performed by the control unit 10.

The acquisition unit 101 acquires an output signal output from a single light receiving unit 15 that receives a plurality of interference beams in which the measurement beam that is output from the single light source 14 and traces the sample arm and the reference beam that is output from the light source 14 and traces the reference arm interfere with each other, the plurality of interference beams each having a different wavelength dispersion characteristic difference between the sample arm and the reference arm traced by the light beams interfering with each other. Hereinafter, details of the processing of the acquisition unit 101 will be described.

The acquisition unit 101 detects a position of the corneal vertex of the eye to be examined of the subject that exists at a predetermined position via the alignment mechanism 13, and adjusts the position of the FD-OCT device 1 such that the detected position of the corneal vertex and the FD-OCT device 1 have a predetermined positional relationship. The acquisition unit 101 causes the light source 14 to output light. In response to the light being output from the light source 14, the light receiving unit 15 receives light including the interference beams A to C for each wavenumber component. The acquisition unit 101 acquires a signal current output from each light receiving element of the light receiving unit 15 that has received the light including the interference beams A to C. Then, the control unit 10 performs interpolation processing on the basis of the detected signal current to obtain signal currents corresponding to a plurality of wavenumber values at equal intervals as a measurement current signal. The control unit 10 acquires the measurement signal by performing discrete Fourier transform on the measurement current signal. The measurement current signal and the measurement signal output from the light receiving unit 15 and subjected to the processing are examples of the output signal.

In addition, the acquisition unit 101 also performs the following processing in the present embodiment. The acquisition unit 101 acquires a signal obtained by performing discrete Fourier transform on a measurement current signal obtained by interpolating a signal current output from the light receiving unit 15 that has received the interference beam A (interference beam between the reference beam A and the measurement beam returned from the mirror) in a state where the half mirror 45 is removed and a mirror for reflecting the incident light in the opposite direction instead of the measurement target is disposed (a state in which none of the reference beam B, the interference beam B, nor the interference beam C exists). The acquisition unit 101 replaces all the values of the signals in the negative frequency band among the signals after the discrete Fourier transform with 0. The acquisition unit 101 acquires a signal of a complex number in the K space by performing inverse Fourier transform on the signal after being replaced. The acquisition unit 101 obtains the phase $\varphi$ of the measurement current signal by obtaining arctangent of a value obtained by dividing an imaginary component by a real component for each of the values of k. The acquisition unit 101 approximates the obtained $\varphi$ with a polynomial $\Sigma_{j=0}(a_j (k-k_0)^j)$. The acquisition unit 101 obtains an approximate value of the value $\varphi_{dispersion}$ indicating the magnitude of the wavelength dispersion characteristic difference (the influence of the wavelength dispersion member 46) generated between the reference arm A and the sample arm A by the wavelength dispersion member 46 by deleting the first term and the second term from the approximated polynomial. Alternatively, the acquisition unit 101 may obtain an approximate value of $\varphi_{dispersion}$ by adding up the third term to the m-th (natural numbers of 3 or more) term of the approximated polynomial.

In addition, $\varphi_{dispersion}$ may be obtained by another method. For example, the acquisition unit 101 acquires a measurement current signal obtained by interpolating a signal current output from the light receiving unit 15 that has received the interference beam A in a state where the half mirror 45 is removed and a mirror for reflecting the incident light in the opposite direction instead of the measurement target is disposed (a state in which neither the reference beam B nor the interference beam B exists). In addition, the acquisition unit 101 sets $\Phi_{dispersion}$ to a predetermined initial value, applies $\exp(-i\varphi_{dispersion})$ to the measurement current signal to correct wavelength dispersion, and acquires a signal obtained by performing discrete Fourier transform on the measurement current signal after being corrected. Next, the acquisition unit 101 varies the value of $\varphi_{dispersion}$, performs similar processing, and acquires a signal (signal in the Z space) after discrete Fourier transform. The acquisition unit 101 repeats the above process and acquires a signal in the Z space for each value of $\varphi_{dispersion}$. Among the signals corrected while changing the value of $\varphi_{dispersion}$, the signal in which the wavelength dispersion is corrected the most has the highest signal intensity. Thus, the acquisition unit 101 may specify a signal having the highest peak (high signal intensity) among the signals, and may set a value of $\varphi_{dispersion}$ corresponding to the specified signal as a determined value of $\varphi_{dispersion}$.

The acquisition unit 101 uses the obtained $\varphi_{dispersion}$ to acquire a correction signal obtained by applying the wavelength dispersion correction processing for correcting the wavelength dispersion influence on the measurement signal. More specifically, the acquisition unit 101 multiplies the measurement current signal by $\exp(-i\varphi_{dispersion})$ to acquire the correction current signal in which the wavelength dispersion influence is corrected. Then, the acquisition unit 101 acquires a signal obtained by performing discrete Fourier transform on the acquired correction current signal as a correction signal obtained by applying the wavelength dispersion correction processing on the measurement signal.

The extraction unit 102 extracts an extraction signal that is a signal for each of the interference beams A to C on the basis of the measurement signal acquired by the acquisition unit 101 and the correction signal. Hereinafter, details of the processing of the extraction unit 102 will be described. In the present embodiment, the zero point B is located in front of the cornea. Therefore, the signal in the frequency band on the negative side in the measurement signal is a mirror signal of the signal in the frequency band on the positive side. Therefore, in the present embodiment, the extraction unit 102 ignores the signal of the frequency band on the negative side of the measurement signal and extracts the signal of each interference beam from the signal of the frequency band on the positive side and the correction signal.

Figure 5:
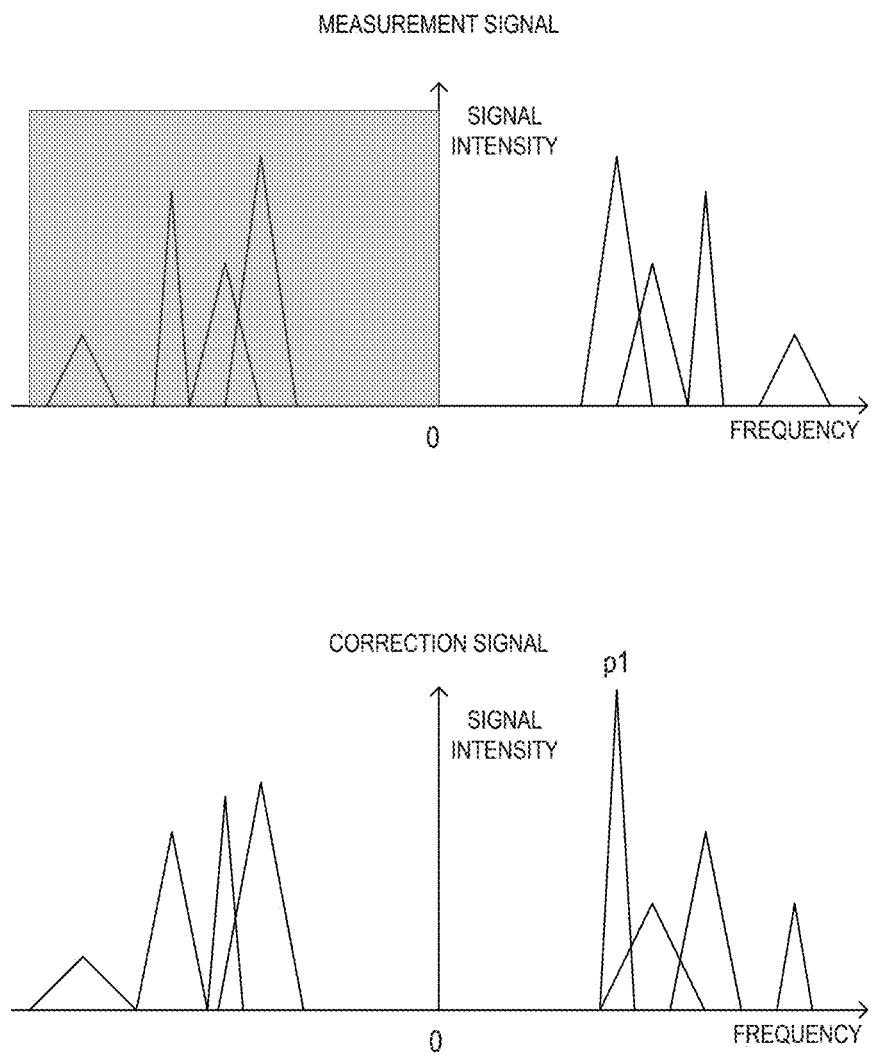
FIG. 5 is a diagram illustrating an example of a measurement signal and a correction signal.

The extraction unit 102 extracts a signal having the highest signal intensity from the measurement signal and the correction signal as a peak signal that is a signal having the highest peak. The peak signal is an example of the extraction signal. FIG. 5 illustrates an example of the measurement signal and the correction signal. In the example of FIG. 5, the signal p1 is a signal having the highest signal intensity.

By the wavelength dispersion correction processing (processing of applying $\exp(-i\varphi_{dispersion})$ to the measurement current signal), the signal in which the wavelength dispersion influence has been corrected has a narrower width and higher intensity than those of the original signal. For a signal not corrected by the wavelength dispersion correction processing, the influence of $\varphi_{dispersion}$ becomes large, and the signal becomes broader (wide in the width and weak in the intensity) than the original signal. Therefore, in a case where a signal having the highest signal intensity exists in the correction signal, this signal is a signal in which the wavelength dispersion by the wavelength dispersion member 46 is corrected (that is, a signal related to the interference beam A or the interference beam C that is originally influenced by the wavelength dispersion member 46). In addition, in a case where a signal having the highest signal intensity exists in the measurement signal, this signal is a signal related to the interference beam B that is not originally affected by the wavelength dispersion member 46.

In a case where the extracted peak signal is included in the correction signal, the extraction unit 102 stores the extracted peak signal in the RAM as a signal related to the interference beam A or C.

Here, when a coordinate value of the peak signal in the Z space is set to (Frequency fr, signal intensity str, Phase θ), the peak signal is represented by str×F[exp(i fr·k+iθ)]. Here, F is an operator representing the discrete Fourier transform. Calculation of the F operator is defined as $F[(f(x)] = /\Sigma_{y=0}^{N-1} f(x) \exp(-2\pi i x y/N)$.

In a case where the peak signal is included in the correction signal, the extraction unit 102 obtains a mirror signal of the peak signal in the correction signal on the basis of the peak signal. Hereinafter, the mirror signal of the peak signal in the correction signal is referred to as a mirror peak signal. More specifically, the extraction unit 102 applies convolution to the peak signal (str×F[exp(i fr·k)+iθ]) with (F[exp(2i$\varphi_{dispersion}$)]/N). Here, N represents the number of pieces of data of the discrete Fourier transform. More specifically, the extraction unit 102 obtains str×F[exp(i fr·k+iθ)]*(F[exp(2i$\varphi_{dispersion}$)]/N). Here, * is an operator representing convolution. Applying convolution to the function f(x) with the function g(x) is defined as follows. That is, $f(x)*g(x) = \Sigma_{y=0}^{N-1} (f(y) \times g(x-y))$ is defined. Then, the extraction unit 102 obtains a value with a sign of a dependent variable k in the convolution result inverted. The extraction unit 102 acquires a signal of a complex conjugate of the obtained value as a mirror peak signal.

Moreover, in a case where the peak signal is included in the correction signal, the extraction unit 102 obtains a signal corresponding to the peak signal in the measurement signal (the peak signal before the correction of the wavelength dispersion influence) on the basis of the peak signal. Hereinafter, the signal corresponding to the peak signal in the measurement signal is referred to as a pre-correction peak signal. More specifically, in a case where the peak signal exists in the frequency band on the positive side as indicated by P1 in FIG. 5, the extraction unit 102 acquires the pre-correction peak signal by applying convolution to the peak signal with (F[exp(i$\varphi_{dispersion}$)]/N). In a case where the peak signal exists in the frequency band on the negative side, the extraction unit 102 applies convolution to the peak signal (str×F[exp(i fr·k+iθ)]) with (F[exp(i$\varphi_{dispersion}$)]/N. Then, the extraction unit 102 acquires the pre-correction peak signal by obtaining the value with the sign of the dependent variable k in the convolution result inverted and obtaining a complex conjugate of the obtained value.

Then, the extraction unit 102 deletes the pre-correction peak signal from the measurement signal. Furthermore, the extraction unit 102 deletes the peak signal and the mirror peak signal from the correction signal. FIG. 6 illustrates an example in which the peak signal P1, the pre-correction peak signal, and the mirror peak signal are deleted in the example of FIG. 5. Signals indicated by broken lines in FIG. 6 indicate the deleted signals. As a result, the signal corresponding to the peak signal is deleted from the measurement signal and the correction signal.

Moreover, in a case where the extracted peak signal is included in the measurement signal, the extraction unit 102 stores the extracted peak signal in the RAM as a signal related to the interference beam B. When the measurement signal and the correction signal each are the signal indicated by the solid line in FIG. 6, the extraction unit 102 extracts the signal p2 as the peak signal.

In a case where the peak signal is included in the measurement signal, the extraction unit 102 obtains a signal corresponding to the peak signal in the correction signal (the peak signal after the correction of the wavelength dispersion influence by the wavelength dispersion member 46 has been performed) and the mirror signal of that signal, on the basis of the peak signal. Hereinafter, the signal corresponding to the peak signal in the correction signal is referred to as a post-correction peak signal. More specifically, the extraction unit 102 acquires the post-correction peak signal by applying convolution to the peak signal with (F[exp(-i$\varphi_{dispersion}$)]/N). Furthermore, the extraction unit 102 performs convolution on the peak signal with (F[exp(i$\varphi_{dispersion}$)]/N) and obtains a value with the sign of the dependent variable k in the convolution result inverted. The extraction unit 102 acquires a mirror signal of the post-correction peak signal by obtaining a complex conjugate of the obtained value.

Then, the extraction unit 102 deletes the peak signal from the measurement signal. FIG. 7 illustrates a state in which the signal corresponding to the signal p2 is deleted from the measurement signal and the correction signal in the example of FIG. 6. A signal indicated by a broken line in FIG. 7 indicates the deleted signal. Furthermore, the extraction unit 102 deletes the post-correction peak signal and the mirror signal of the post-correction peak signal from the correction signal. As a result, the signal corresponding to the peak signal is deleted from the measurement signal and the correction signal.

The extraction unit 102 repeats the above processing (processing of extracting and storing the peak signal from the measurement signal and the correction signal and deleting the signal corresponding to the peak signal from the measurement signal and the correction signal) until there is no signal having a signal intensity equal to or higher than a predetermined threshold in the measurement signal and the correction signal. FIG. 8 illustrates the measurement signal and the correction signal when this processing is repeated until there is no signal having a signal intensity equal to or higher than a predetermined threshold in the example of FIG. 5.

The extraction unit 102 combines the correction signal from which the signal corresponding to the extracted peak signal is deleted and the peak signals related to the interference beams A and C stored in the RAM. In this manner, the extraction unit 102 extracts the signals measured using the interference beams A and C. Moreover, the extraction unit 102 combines the measurement signal from which the signal corresponding to the extracted peak signal is deleted and the peak signal related to the interference beam B stored in the RAM. As a result, the extraction unit 102 extracts the signals measured using the interference beam B. FIG. 9 illustrates signals related to the interference beams A and C and the signal related to the interference beam B extracted in the example of FIG. 5.

In this manner, the extraction unit 102 extracts the signals related to the respective interference beams from the measurement signal.

In the present embodiment, the extraction unit 102 generates an image of a measurement target from a signal extracted for each interference beam by a known method. More specifically, the extraction unit 102 generates an image (A image) near the retina to be measured using the interference beam A by using the signals measured using the interference beams A and C. Moreover, the extraction unit 102 generates an image (B image) near the cornea to be measured using the interference beam B by using the signals measured using the interference beam B.

The deriving unit 103 derives a difference between an optical path length of the reference arm A and an optical path length of the reference arm B on the basis of an extraction signal corresponding to the interference beam C that is an interference beam between the reference beam A tracing the reference arm A and the reference beam B tracing the reference arm B among extraction signals extracted by the extraction unit 102. Hereinafter, details of the processing of the deriving unit 103 will be described. The signals related to the interference beams A and C extracted by the extraction unit 102 include the signal related to the interference beam C. This signal appears as a peak of frequency corresponding to a distance between the zero point A and the zero point B in the Z space. In the present embodiment, a range in which the zero point B can exist as viewed from the zero point A is determined in advance. The deriving unit 103 specifies a peak included in a frequency band corresponding to the above range in the signals related to the interference beams A and C extracted by the extraction unit 102 as a signal related to the interference beam C. The deriving unit 103 derives a distance between the zero point A and the zero point B (a difference between an optical path length of the reference arm A and an optical path length of the reference arm B) from the frequency of the specified signal. In this manner, the deriving unit 103 can obtain the distance between the zero points.

The display control unit 104 causes the display unit 16 to display a plurality of images generated for the respective interference beams on the basis of the extraction signal extracted by the extraction unit 102. Details of the processing of the display control unit 104 will be described.

Figure 10:
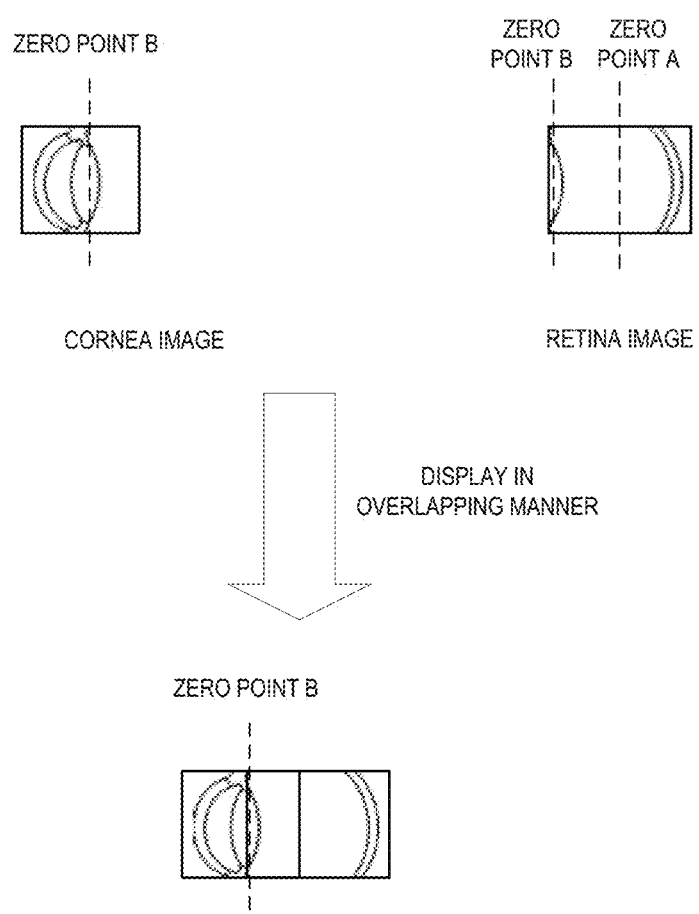
FIG. 10 is a diagram illustrating an example of a display mode of an image.

The display control unit 104 causes the display unit 16 to display each of the plurality of images generated by the extraction unit 102 such that the images have a positional relationship in accordance with the positional relationship of the subject. That is, the display control unit 104 displays the B image and the A image such that the cornea in the B image and the retina in the A image have the same positional relationship as the actual cornea and retina at the scale in the image. More specifically, the display control unit 104 specifies the position of the zero point B in the B image and the position of the zero point A in the A image. In addition, the display control unit 104 specifies the position of the zero point B in the A image on the basis of the difference (distance between the zero point A and the zero point B) between the reference arm A and the reference arm B derived by the deriving unit 103. The display control unit 104 displays the B image and the A image such that the position of the zero point B in the B image and the position of the zero point B in the A image overlap with each other. Furthermore, in a case where the B image and the A image partially overlap with each other, the display control unit 104 displays the B image and the A image in an overlapping manner for overlapping portions. More specifically, the display control unit 104 displays an image obtained by combining the B image and the A image by 50% each for the overlapping portions. However, the display control unit 104 may display either the B image or the A image for the overlapping portions. FIG. 10 illustrates an example of the B image and the A image displayed in an overlapping manner. As a result, the display control unit 104 can present images of a plurality of measurement targets to the user in the same positional relationship as the actual positional relationship. Furthermore, the display control unit 104 can present the A image and the B image to the user in an integral manner by displaying the A image and the B image in an overlapping manner for the overlapping portions.

Note that the display control unit 104 does not necessarily specify the position of the zero point B in the B image and the A image. For example, the display control unit 104 may detect the same object (for example, a crystalline lens) from each of the A image and the B image, and display the B image and the A image such that the detected objects are overlapped with each other.

However, the display control unit 104 may display the B image and the A image in another display mode. For example, the display control unit 104 may display the B image and the A image in another display mode as long as the direction of the retina viewed from the cornea is the same as the direction of the retina in the A image viewed from the cornea in the B image. For example, the display control unit 104 may display the B image and the A image so as not to overlap with each other.

As described above, with the configuration of the present embodiment, the FD-OCT device 1 acquires the measurement signal that is the signal related to the interference beams A and B having different wavelength dispersion characteristic differences between the corresponding sample arm and the reference arm, and performs the wavelength dispersion correction processing on the interference beam A on the acquired measurement signal to acquire the correction signal. Then, the PD-OCT device 1 extracts the signal of the retina of the eye to be examined to be measured using the interference beam A and the signal of the cornea of the eye to be examined to be measured using the interference beam B from the measurement signal and the correction signal using the characteristic of the change in the signal in accordance with the wavelength dispersion correction processing. As described above, the FD-OCT device 1 can extract signals at a plurality of positions more easily than before without taking time and effort to make the wavelength dispersion characteristics of the sample arm and the reference arm the same.

Figure 11:
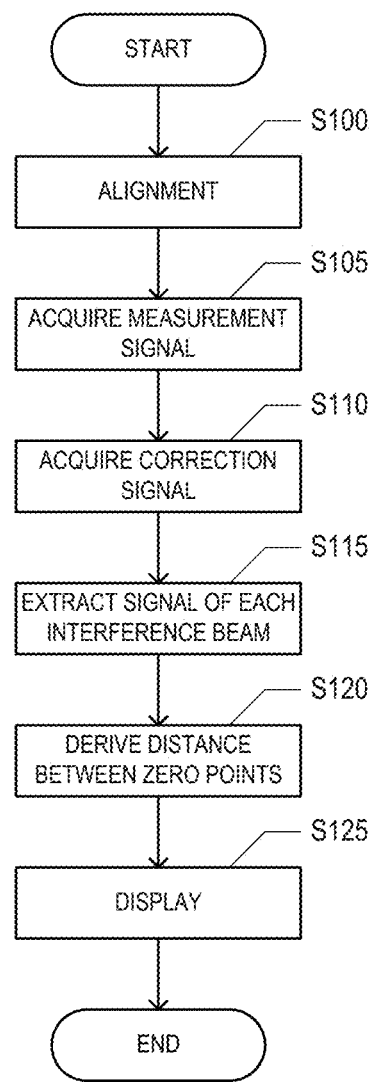
FIG. 11 is a flowchart illustrating an example of extraction processing.

(1-2) Extraction Processing:

Eye axial length measurement processing executed by the FD-OCT device 1 according to the present embodiment will be described with reference to FIG. 11. The control unit 10 starts the processing of FIG. 11 at a designated timing after the eye to be examined of the subject is arranged at a predetermined position.

In step S100, the acquisition unit 101 detects a position of a corneal vertex of the eye to be examined of the subject that exists at a predetermined position via the alignment mechanism 13, and adjusts the position of the FD-OCT device 1 such that the detected position of the corneal vertex and the FD-OCT device 1 have a predetermined positional relationship. After the completion of the processing in step S100, the acquisition unit 101 advances the processing to step S105.

In step S105, the acquisition unit 101 acquires the measurement current signal by causing the light source 14 to output light, and interpolating the signal current output from the light receiving unit 15 with respect to the wavenumber k. After the completion of the processing in step S105, the acquisition unit 101 advances the processing to step S110.

In step S110, the acquisition unit 101 acquires the magnitude $\varphi_{dispersion}$ of the wavelength dispersion characteristic difference between the reference arm A and the sample arm. Then, the acquisition unit 101 acquires the correction signal by applying the $\exp(-i\varphi_{dispersion})$ to the measurement current signal acquired in step S105 to correct wavelength dispersion, and performing discrete Fourier transform on the corrected signal. After the completion of the processing in step S110, the acquisition unit 101 advances the processing to step S115. The processing in steps S105 to S110 is an example of the acquisition step.

In step S115, the extraction unit 102 performs the following processing. The extraction unit 102 extracts a maximum peak as a peak signal from the measurement signal acquired in step S105 and the correction signal acquired in step S110. In a case where the peak signal is included in the correction signal, the extraction unit 102 stores the peak signal in the RAM as a signal related to the interference beams A or C. Then, the extraction unit 102 obtains the mirror peak signal and the pre-correction peak signal on the basis of the peak signal. The extraction unit 102 deletes the peak signal and the mirror signal from the correction signal, and deletes the pre-correction peak signal from the measurement signal. Moreover, in a case where the peak signal is included in the measurement signal, the extraction unit 102 stores the peak signal in the RAM as a signal related to the interference beam B. Then, the extraction unit 102 obtains a post-correction peak signal and a mirror signal of the post-correction peak signal on the basis of the peak signal. The extraction unit 102 deletes the post-correction peak signal and the mirror signal of the post-correction peak signal from the correction signal and deletes the peak signal from the measurement signal. The extraction unit 102 repeats the above processing until there is no signal having a signal intensity equal to or higher than a predetermined threshold in the measurement signal and the correction signal.

The extraction unit 102 combines the measurement signal from which the peak signal and the pre-correction peak signal are deleted with the peak signal related to the interference beam B stored in the RAM, to extract the signal related to the interference beam B. In addition, the extraction unit 102 combines the correction signal from which the peak signal, the mirror peak signal, the post-correction peak signal, and the mirror signal of the post-correction peak signal are deleted with the peak signals related to the interference beams A and C stored in the RAM, to extract the signals related to the interference beams A and C. The extraction unit 102 generates an image near the cornea on the basis of the extracted signal related to the interference beam B. Moreover, the extraction unit 102 generates an image near the retina on the basis of the extracted signals related to the interference beams A and C. After the completion of the processing in step S115, the extraction unit 102 advances the processing to step S120. The processing in step S115 is an example of an extraction step.

In step S120, the deriving unit 103 derives the distance between the zero point A and the zero point B on the basis of the signal related to the interference beam C extracted in step S115. After the completion of the processing in step S120, the deriving unit 103 advances the processing to step S125.

In step S125, the display control unit 104 specifies the position of the zero point B in the image near the cornea generated in step S115. In addition, the display control unit 104 specifies the position of the zero point B in the image near the retina generated in step S115 on the basis of the distance derived in step S120. Then, the display control unit 104 displays the image near the cornea and the image near the retina on the display unit 16 so as to match the positions of the zero point B in the images.

(2) Second Embodiment

In the first embodiment, a case where a plurality of reference arms having different wavelength dispersion characteristics are provided has been described. In the present embodiment, a case where a plurality of sample arms having different wavelength dispersion characteristics are provided will be described.

Figure 12:
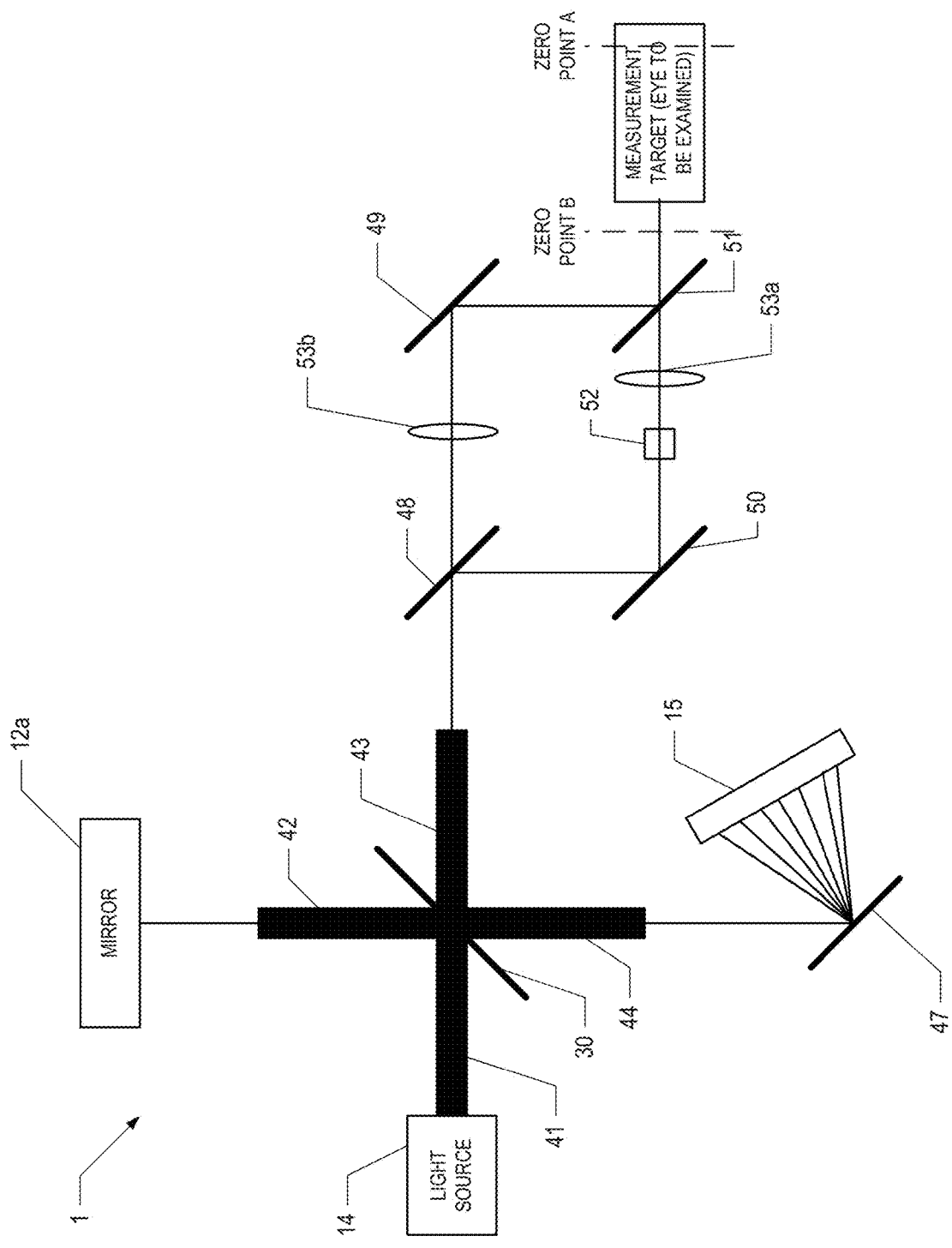
FIG. 12 is a diagram illustrating a configuration of an FD-OCT device according to an embodiment of the present disclosure.

FIG. 12 illustrates a configuration of the FD-OCT device 1 according to the present embodiment. In FIG. 12, components denoted by the same reference numerals as those in FIG. 2 are the same as those in FIG. 2. In the configuration of the FD-OCT device 1 according to the present embodiment, differences from the first embodiment will be described.

In the present embodiment, the FD-OCT device 1 does not include the mirror 12b, the half mirror 45, and the wavelength dispersion member 46, and has one reference arm. In addition, the FD-OCT device 1 includes an optical system (polarization beam splitters 48 and 51, mirrors 49 and 50, a wavelength dispersion member 52, lenses 53a and 53b) for forming a plurality of sample arms having different wavelength dispersion characteristics.

A sample arm traced by the measurement beam in the FD-OCT device 1 according to the present embodiment will be described. The measurement beam made to branch by the branching part 30 travels toward the polarization beam splitter 48. In the polarization beam splitter 48, the measurement beam is made to branch into light traveling toward the mirror 49 and light traveling toward the mirror 50. In the present embodiment, the light traveling toward the mirror 50 is a measurement beam used to measure the retina of the eye to be examined Hereinafter, the measurement beam used to measure the retina of the eye to be examined is referred to as the measurement beam A. An optical path traced by the measurement beam A is referred to as the sample arm A. The light traveling toward the mirror 49 is a measurement beam used to measure the cornea of the eye to be examined Hereinafter, the measurement beam used to measure the cornea of the eye to be examined is referred to as the measurement beam B. An optical path traced by the measurement beam B is referred to as the sample arm B.

The measurement beam A made to branch by the polarization beam splitter 48 and having reached the mirror 50 is reflected by the mirror 50, passes through the wavelength dispersion member 52 and the lens 53a, and travels toward the polarization beam splitter 51. The lens 53a is a lens that focuses (makes a focus) near the position of the measurement target to be measured using the measurement beam A. However, in the present embodiment, it is conceivable that an object to be measured using the measurement beam A is the retina, and the measurement beam A is collected near the retina by the cornea or crystalline lens of the eye to be examined Therefore, the lens 53a is not necessarily provided. Then, the measurement beam A passes through the polarization beam splitter 51 and travels toward the retina of the eye to be examined as a measurement target. The measurement beam A is reflected and scattered by the retina, and is partially returned in a direction opposite to the incident direction. The measurement beam A passes through the polarization beam splitter 51, the lens 53a, the wavelength dispersion member 52, the mirror 50, and the polarization beam splitter 48, and is returned to the branching part 30.

The measurement beam B made to branch by polarization beam splitter 48 passes through the lens 53b and travels toward the mirror 49. The lens 53b is a lens that is in a different position from the lens 53a and that focuses near the cornea to be measured using the measurement beam B As described above, in the sample arm, a lens that focuses near the measurement target is provided, and thus the FD-OCT device 1 can perform measurement with higher accuracy. The measurement beam B is reflected by the mirror 49, travels toward the polarization beam splitter 51, is changed in direction by the polarization beam splitter 51, is reflected and scattered by the cornea of the eye to be examined, and is partially returned in the direction opposite to the incident direction. The measurement beam B passes through the polarization beam splitter 51, the mirror 49, the lens 53b, and the polarization beam splitter 48, and is returned to the branching part 30.

In the branching part 30, an interference beam (hereinafter, an interference beam A) between the measurement beam A and the reference beam (light traveling toward the mirror 12a and returned from the mirror 12a) and an interference beam (hereinafter, an interference beam B) between the measurement beam B and the reference beam are generated. The generated interference beams A and B pass through the transmission part 44 and the diffraction grating 47, and are received by the light receiving unit 15 for each wavenumber component. The interference beam A has wavelength dispersion occurring due to the influence of the wavelength dispersion member 52. The interference beam B is not affected by the wavelength dispersion member 52.

Processing of the FD-OCT device 1 according to the present embodiment will be described.

Processing of the acquisition unit 101 according to the present embodiment is similar to that of the first embodiment. That is, the acquisition unit 101 interpolates the signal current output from the light receiving unit 15 that has received the interference beams A to C with respect to the wavenumber k to acquire the measurement current signal. Then, the acquisition unit 101 performs discrete Fourier transform on the acquired measurement current signal to acquire a measurement signal.

In addition, the acquisition unit 101 obtains the magnitude $\varphi_{dispersion}$ of the wavelength dispersion due to the influence of the wavelength dispersion member 52 in the interference beam A. The acquisition unit 101 obtains $\varphi_{dispersion}$ by a method similar to the first embodiment. That is, the acquisition unit 101 obtains an approximate value of the $\varphi_{dispersion}$ on the basis of a measurement current signal obtained by interpolating a signal current output from the light receiving unit 15 that has received the interference beam A in a state where the lens 53b is shielded (a state where neither the measurement beam B nor the interference beam B exists).

The acquisition unit 101 uses the obtained $\varphi_{dispersion}$ to acquire, by the method similar to that in the first embodiment, a correction signal obtained by applying the wavelength dispersion correction processing for correcting the wavelength dispersion influence on the measurement signal.

The extraction unit 102 extracts an extraction signal for each of the interference beams A and B on the basis of the measurement signal acquired by the acquisition unit 101 and the correction signal. In the present embodiment, the zero point B in the sample arm B is located in front of the cornea. Therefore, the signal in the frequency band on the negative side in the measurement signal is a mirror signal of the signal on the positive side. Therefore, in the present embodiment, the extraction unit 102 ignores the signal of the frequency band on the negative side of the measurement signal and extracts the extraction signal of each interference beam from the signal of the frequency band on the positive side of the measurement signal and the correction signal.

The extraction unit 102 extracts a signal related to the interference beam A and a signal related to the interference beam B from the measurement signal and the correction signal by performing processing similar to that of the first embodiment. That is, the extraction unit 102 extracts a signal having the highest signal intensity from the measurement signal and the correction signal as a peak signal that is a signal having the highest peak.

In a case where the extracted peak signal is included in the correction signal, the extraction unit 102 stores the peak signal in the RAM as a signal related to the interference beam A. Moreover, the extraction unit 102 acquires the mirror peak signal and the pre-correction peak signal on the basis of the peak signal.

Then, the extraction unit 102 deletes the pre-correction peak signal from the measurement signal. Furthermore, the extraction unit 102 deletes the peak signal and the mirror peak signal from the correction signal. As a result, the signal corresponding to the peak signal is deleted from the measurement signal and the correction signal.

Moreover, in a case where the extracted peak signal is included in the measurement signal, the extraction unit 102 stores the extracted peak signal in the RAM as a signal related to the interference beam B. Moreover, the extraction unit 102 acquires the post-correction peak signal and the mirror signal of the post-correction peak signal on the basis of the peak signal.

Then, the extraction unit 102 deletes the peak signal from the measurement signal. Furthermore, the extraction unit 102 deletes the post-correction peak signal and the mirror signal of the post-correction peak signal from the correction signal. As a result, the signal corresponding to the peak signal is deleted from the measurement signal and the correction signal.

The extraction unit 102 repeats the above processing until there is no signal having a signal intensity equal to or higher than a predetermined threshold in the measurement signal and the correction signal.

The extraction unit 102 combines the correction signal from which the signal corresponding to the extracted peak signal is deleted with the peak signal related to the interference beam A stored in the RAM. As a result, the extraction unit 102 extracts the signal measured using the interference beam A. Moreover, the extraction unit 102 combines the peak signal related to the interference beam B stored in the RAM with the measurement signal from which the signal corresponding to the extracted peak signal is deleted. As a result, the extraction unit 102 extracts the signals measured using the interference beam B.

In this manner, the extraction unit 102 extracts the signals related to the respective interference beams from the measurement signal.

In the present embodiment, the extraction unit 102 generates an image of a measurement target from a signal extracted for each interference beam by a known method. More specifically, the extraction unit 102 generates an image (A image) near the retina to be measured using the interference beam A by using the signals measured using the interference beam A. Moreover, the extraction unit 102 generates an image (B image) near the cornea to be measured using the interference beam B by using the signals measured using the interference beam B.

Processing of the display control unit 104 is the same as that in the first embodiment.

As described above, with the configuration of the present embodiment, the FD-OCT device 1 can measure a plurality of positions together more easily than before even when there are a plurality of sample arms.

Figure 13:
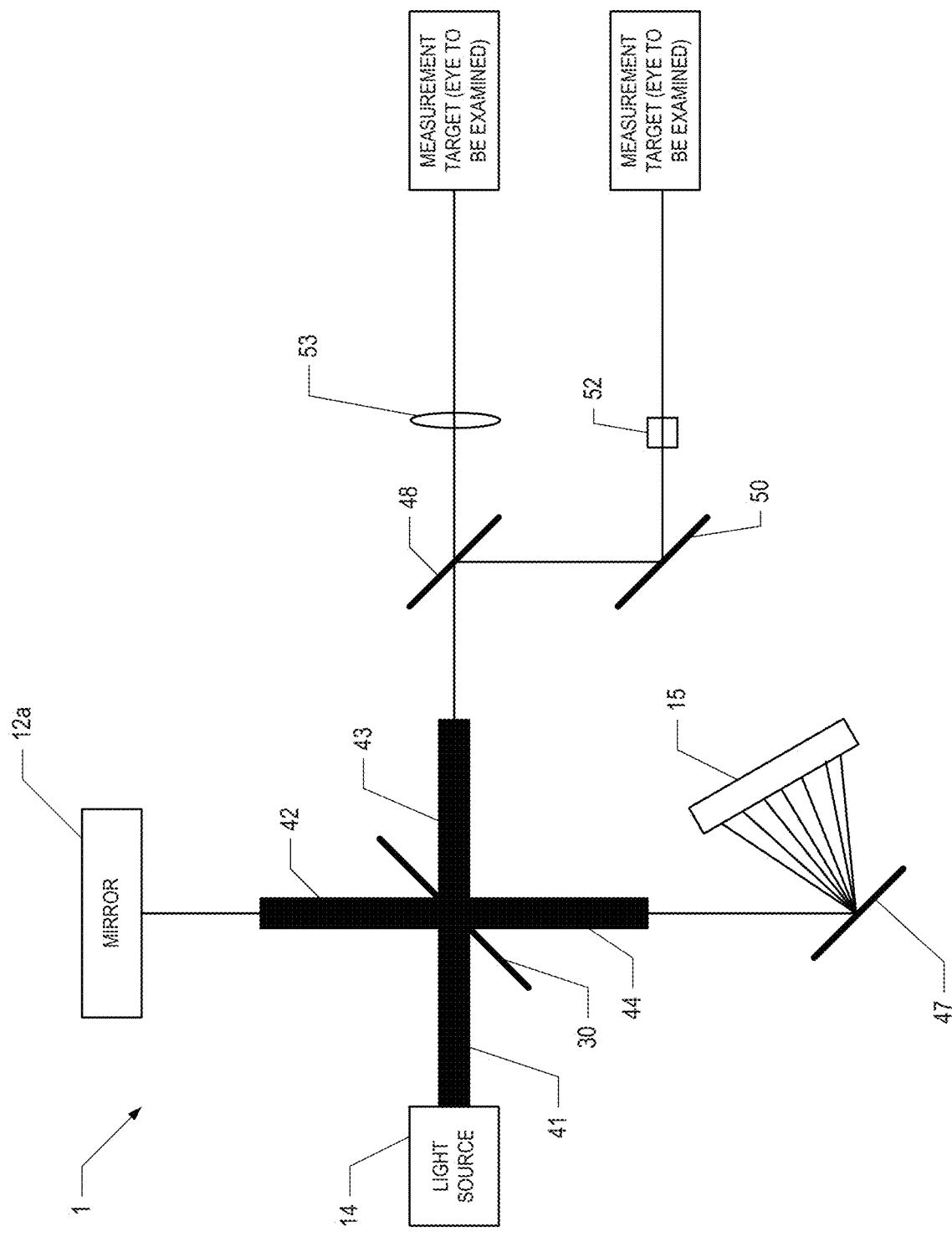
FIG. 13 is a diagram illustrating a configuration of the FD-OCT device according to the embodiment of the present disclosure.
Figure 14:
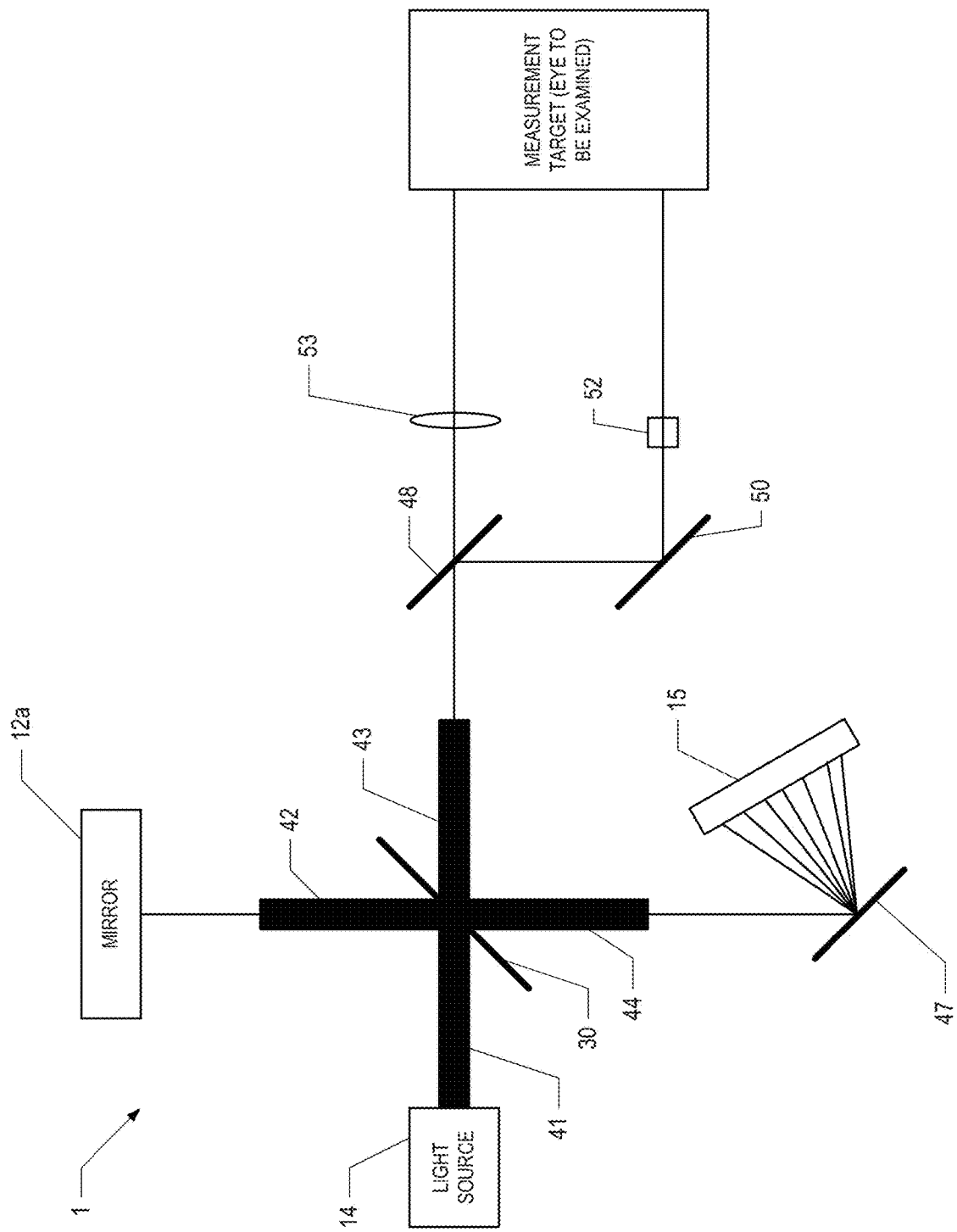
FIG. 14 is a diagram illustrating a configuration of the FD-OCT device according to the embodiment of the present disclosure.

Moreover, the sample arm A and the sample arm B may be configured such that the measurement beam A and the measurement beam B travel toward different measurement targets. For example, as illustrated in FIG. 13, the measurement beam A may pass through an optical axis different from that of the measurement beam B and travel toward a measurement target different from the measurement target of the measurement beam B. Moreover, as illustrated in FIG. 14, the sample arm A and the sample arm B may be configured such that the measurement beam A and the measurement beam B travel toward different positions of the same measurement target passing through different optical axes. As a result, the FD-OCT device 1 can measure a plurality of positions existing on different optical axes together.

(3) Third Embodiment

In the present embodiment, a case will be described where each of the interference beams used for measurement of a measurement target is an interference beam between each of the measurement beams tracing different sample arms and each of the reference beams tracing different reference arms. That is, a case will be described where a different reference arm and a different sample arm exist for each of the interference beams used for the measurement.

Figure 15:
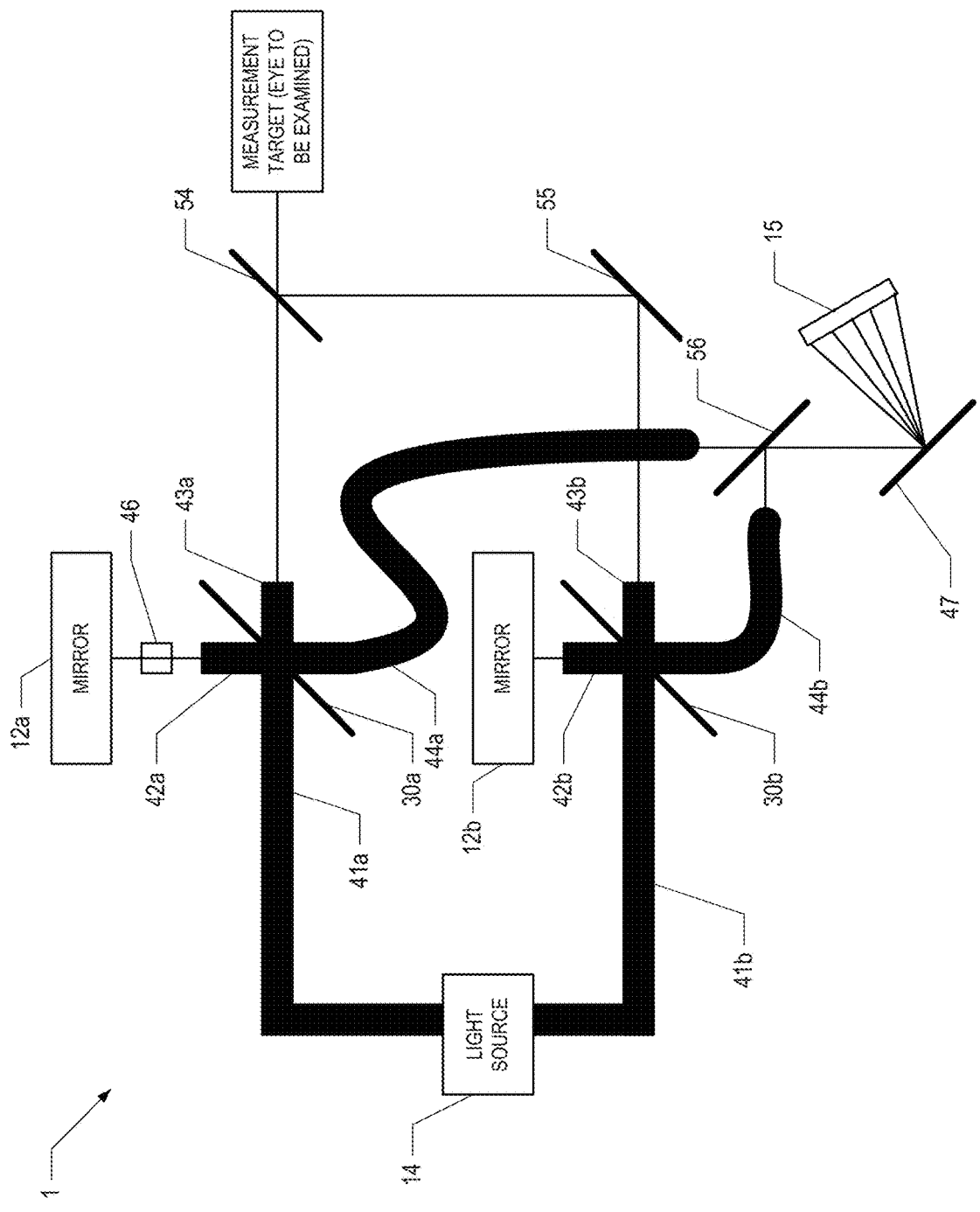
FIG. 15 is a diagram illustrating a configuration of an FD-OCT device according to an embodiment of the present disclosure.

FIG. 15 illustrates a configuration of the FD-OCT device 1 according to the present embodiment. Components having the same symbols as those in FIG. 2 are the same as those in FIG. 2. The FD-OCT device 1 according to the present embodiment is different from that of the first embodiment in that a transmission part and a branching part for forming the reference arm A and the sample arm A are provided separately from a transmission part and a branching part for forming the reference arm B and the sample arm B.

In the present embodiment, the PD-OCT device 1 includes two sets (transmission parts 41a to 44a and a branching part 30a, transmission parts 41b to 44b and a branching part 30b) corresponding to the transmission parts 41 to 44 and the branching part 30 in FIG. 2. The transmission parts 41a to 44a and the branching part 30a are used to form a reference arm (reference arm A) traced by the reference beam (reference beam A) traveling toward the mirror 12a and a sample arm (sample arm A) traced by the measurement beam (measurement beam A). The transmission parts 41b to 44b and the branching part 30b are used to form a reference arm (reference arm B) traced by the reference beam (reference beam B) traveling toward the mirror 12b and a sample arm (sample arm B) traced by the measurement beam (measurement beam B).

The measurement beam A output from the transmission part 43a passes through the polarization beam splitter 54, travels toward the measurement target, and passes through the polarization beam splitter 54 to return from the measurement target to the transmission unit 43a. In the branching part 30a, the returned measurement beam A and the reference beam A are synthesized to generate an interference beam A. The interference beam A passes through the transmission part 44a, the polarization beam splitter 56, and the diffraction grating 47 and travels toward the light receiving unit 15. Moreover, the measurement beam B output from the transmission part 43b passes through the mirror 55 and the polarization beam splitter 54, travels toward the measurement target, and passes through the polarization beam splitter 54 and the mirror 55 to return from the measurement target to the transmission part 43b. In the branching part 30b, the returned measurement beam B and the reference beam B are synthesized to generate an interference beam B. The interference beam B passes through the transmission part 44b, the polarization beam splitter 56, and the diffraction grating 47 and travels toward the light receiving unit 15.

Processing of the FD-OCT device 1 according to the present embodiment is similar to that of the first embodiment.

As described above, with the configuration of the present embodiment, the FD-OCT device 1 can measure a plurality of positions together more easily than before even when there exist different reference arms and different sample arms for each interference beam used for measurement.

(4) Fourth Embodiment

In the first embodiment, two positions are measured. In the present embodiment, a case where three or more positions are measured will be described.

Figure 16:
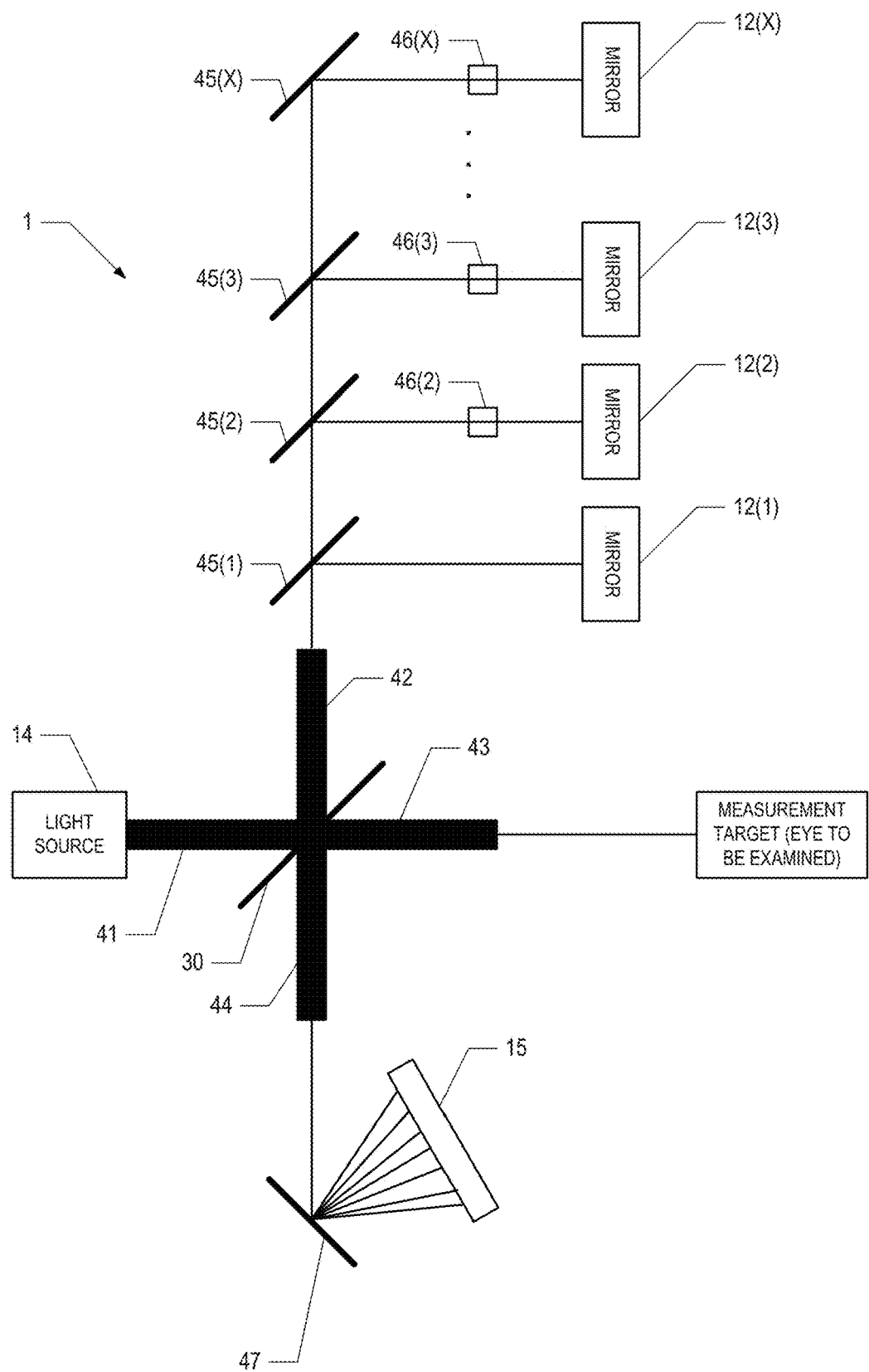
FIG. 16 is a diagram illustrating a configuration of an FD-OCT device according to an embodiment of the present disclosure.

FIG. 16 illustrates a configuration of the FD-OCT device 1 according to the present embodiment. Components denoted by the same reference numerals as those in FIG. 2 are the same as those in FIG. 2. In the configuration of the FD-OCT device 1 according to the present embodiment, differences from the first embodiment will be described. The FD-OCT device 1 according to the present embodiment includes X (an integer of 3 or more) sets of half mirrors and mirrors for forming X reference arms. In the present embodiment, a half mirror and a mirror for forming an n-th set of reference arms (in the following, the reference arm (n)) are referred to as a half mirror $45(n)$ and a mirror $12(n)$. For n of 2 or more, wavelength dispersion members $46(n)$ having different wavelength dispersion characteristics are each disposed between the half mirror $45(n)$ and the mirror $12(n)$.

The reference beam (n) output from the transmission part 42 passes through the half mirrors (1) to (n) and the wavelength dispersion member $46(n)$, reaches the mirror $12(n)$, is reflected, passes through the wavelength dispersion member $46(n)$, the half mirrors (n) to (1), and the transmission part 42, and reaches the branching part 30.

In the branching part 30, interference beams between each of the reference beams (1) to (X) and the measurement beam are generated. Hereinafter, the interference beam between the reference beam (n) and the measurement beam is referred to as an interference beam (n). The light including interference beams (1) to (X) travels toward the light receiving unit 15 and is received thereby. In the present embodiment, due to the influence of the wavelength dispersion members $46(2)$ to (X), the interference beams (1) to (X) have different wavelength dispersion characteristic differences of the reference arm and the sample arm traced by the reference beam and the measurement beam interfering with each other. That is, the wavelength dispersion characteristic difference between the reference arm and the sample arm traced by the reference beam and the measurement beam included in the interference beam (n) is different from the wavelength dispersion characteristic difference between the reference arm and the sample arm traced by the reference beam and the measurement beam included in the interference beam (m) (m≠n).

Processing of the FD-OCT device 1 according to the present embodiment will be described.

The acquisition unit 101 interpolates the signal current output from the light receiving unit 15 with respect to the wavenumber k and acquires a measurement current signal. Then, the acquisition unit 101 acquires a measurement signal by performing discrete Fourier transform on the acquired measurement current signal. The acquisition unit 101 approximates the obtained φ with a polynomial $\Sigma_j=0(a_j$ $(k-k_0)^j$). The acquisition unit 101 obtains an approximate value of the value $\varphi_{dispersion}$ indicating the magnitude of the wavelength dispersion characteristic difference (the influence of the wavelength dispersion member 46) generated between the reference arm A and the sample arm A by the wavelength dispersion member 46 by deleting the first term and the second term from the approximated polynomial. Alternatively, the acquisition unit 101 may obtain the approximate value of $\varphi_{dispersion}$ by adding up the third term to the m-th (m is a natural number of 3 or more) term of the approximated polynomial.

The acquisition unit 101 obtains magnitudes of wavelength dispersions $\varphi_{dispersion\_2}$ to $\varphi_{dispersion\_X}$ due to the respective influences of the wavelength dispersion members 46(2) to 46(X) in each of the interference beams (2) to (X). The acquisition unit 101 obtains $\varphi_{dispersion\_n}$ (each of n: 1 to X) by the method similar to that in the first embodiment. That is, the acquisition unit 101 acquires a signal obtained by performing discrete Fourier transform on a measurement current signal obtained by interpolating a signal current output from the light receiving unit 15 that has received the interference beam (n) in a state where there is no reference beam other than the reference beam (n) (for example, a state in which the half mirrors 45(1) to 45(X) other than the half mirror 45(n) are removed). The acquisition unit 101 replaces all the values of the signals in the negative frequency band among the signals after the discrete Fourier transform with 0. The acquisition unit 101 acquires a signal of a complex number in the K space by performing inverse Fourier transform on the signal after being replaced. The acquisition unit 101 obtains the phase φ of the measurement current signal by obtaining arctangent of a value obtained by dividing an imaginary component by a real component for each of the values of k. The acquisition unit 101 approximates the obtained φ with a polynomial $\Sigma_{j=0}(a_j (k-k_0)^j)$. The acquisition unit 101 obtains an approximate value of the value $\varphi_{dispersion\_n}$ indicating the magnitude of the wavelength dispersion characteristic difference (the influence of the wavelength dispersion member 46(n)) generated between the reference arm A and the sample arm A by the wavelength dispersion member 52 by deleting the first term and the second term from the approximated polynomial. Alternatively, the acquisition unit 101 may obtain an approximate value of $\varphi_{dispersion\_n}$ by adding up the third term to the m-th (a natural number of 3 or more) term of the approximated polynomial. In addition, the acquisition unit 101 obtains the magnitude $\varphi_{dispersion\_1}$ of the wavelength dispersion in the interference beam (1). In the present embodiment, since no wavelength dispersion member is arranged in the reference arm (1), the acquisition unit 101 sets the magnitude of wavelength dispersion $\varphi_{dispersion\_1}$ in the interference beam (1) to 0.

In addition, $\varphi_{dispersion\_n}$ may be obtained by another method. For example, the acquisition unit 101 acquires the measurement current signal obtained by interpolating the signal current output from the light receiving unit 15 that has received the light including the interference beam (n) in a state where there is no reference beam other than the reference beam (n). In addition, the acquisition unit 101 sets $\varphi_{dispersion\_n}$ to a predetermined initial value, applies $\exp(-i\varphi_{dispersion\_n})$ to the measurement current signal to correct wavelength dispersion, and acquires a signal obtained by performing discrete Fourier transform on the measurement current signal after being corrected. Next, the acquisition unit 101 varies the value of $\varphi_{dispersion\_n}$, performs similar processing, and acquires a signal (signal in the Z space) after discrete Fourier transform. The acquisition unit 101 repeats the above process and acquires a signal in the Z space for each value of $\varphi_{dispersion\_n}$. Among the signals corrected while changing the value of $\varphi_{dispersion\_n}$, the signal in which the wavelength dispersion has been corrected the most has the highest signal intensity. Thus, the acquisition unit 101 may specify a signal having the highest peak (high signal intensity) among the signals, and may set a value of $\varphi_{dispersion\_n}$ corresponding to the specified signal as a determined value of $\varphi_{dispersion\_n}$.

In addition, the acquisition unit 101 obtains the magnitude $\varphi_{dispersion\_1}$ of the wavelength dispersion in the interference beam (1) as 0. In the present embodiment, since no wavelength dispersion member is arranged in the reference arm (1), the magnitude of the wavelength dispersion $\varphi_{dispersion\_1}$ in the interference beam (1) is set to 0.

The acquisition unit 101 acquires a correction signal (n) in which the wavelength dispersion in the interference beam (n) is corrected by applying $\exp(-i \varphi_{dispersion\_n})$ to the measurement current signal for each $\varphi_{dispersion\_n}$ of $\varphi_{dispersion\_1}$ to $\varphi_{dispersion\_X}$ to correct the wavelength dispersion and performing discrete Fourier transform on the corrected signal. In the following description, the acquisition unit 101 treats the measurement signal as a correction signal (1). In the present embodiment, the zero point of the reference arm (1) in the sample arm is adjusted to be in front of the measurement target. Therefore, the signal of the negative frequency band of the correction signal (1) is ignored.

The extraction unit 102 extracts a signal having the highest signal intensity from the correction signals (1) to (n) as a peak signal that is a signal having the highest peak. FIG. 17 is an example of the measurement signal and the correction signal. In the example of FIG. 17, the signal pn is a signal having the highest signal intensity.

In a case where the extracted peak signal is included in the correction signal (n), the extraction unit 102 stores the extracted peak signal in the RAM as a signal related to the interference beam (n) (or an interference beam between the reference beam (n) and the reference beam (1)).

In a case where the peak signal is included in the correction signal (n), the extraction unit 102 obtains a mirror signal of the peak signal (mirror peak signal) in the correction signal (n) on the basis of the peak signal. More specifically, the extraction unit 102 applies convolution to the peak signal (str×F[exp(i fr−k+iθ]) with (F[exp($2i\varphi_{dispersion\_n}$)]/N). Then, the extraction unit 102 obtains a value with a sign of a dependent variable k in the convolution result inverted. The extraction unit 102 acquires a signal of a complex conjugate of the obtained value as a mirror peak signal.

Moreover, in a case where the peak signal is included in the correction signal (n), the extraction unit 102 obtains a signal corresponding to the peak signal in another correction signal on the basis of the peak signal. More specifically, the extraction unit 102 obtains a signal corresponding to the peak signal in the correction signal (m)(m≠n) and a mirror signal of this signal as follows. Hereinafter, the signal corresponding to the peak signal in the correction signal (m) is referred to as a corresponding signal (m). That is, the extraction unit 102 acquires the corresponding signal (m) by applying convolution to the peak signal with (F[exp($i\varphi_{dispersion\_n}-i\varphi_{dispersion\_m}$)]/N). Furthermore, the extraction unit 102 applies convolution to the peak signal with (F[exp($i\varphi_{dispersion\_n}i\varphi_{dispersion\_m}$)]/N). Then, the extraction unit 102 acquires the mirror signal of the corresponding signal (m) by inverting the sign of the dependent variable k in the convolution result and obtaining a complex conjugate. However, in the case of m=1, the extraction unit 102 does not necessarily acquire a signal existing in the negative frequency band out of the corresponding signal (m) and the mirror signal of the corresponding signal (m). In FIG. 17, the corresponding signal (m) of the peak signal pn existing in the correction signal (n) and the mirror signal of the corresponding signal (m) are indicated by broken lines.

The extraction unit 102 deletes the peak signal and the mirror peak signal from the correction signal (n). In addition, the extraction unit 102 deletes the corresponding signal (m) and the mirror signal of the corresponding signal (m) from each of the other correction signals (m). However, in the case of m=1, the extraction unit 102 deletes a signal existing in the positive frequency band out of the corresponding signal (m) and the mirror signal of the corresponding signal (m).

The extraction unit 102 repeats the above processing (processing of extracting and storing the peak signal from the correction signals (1) to (X) and deleting the signal corresponding to the peak signal from the correction signals (1) to (X)) until there is no signal having a signal intensity equal to or higher than a predetermined threshold in the correction signals (1) to (X).

The extraction unit 102 combines, for each correction signal, the correction signal (n) from which a signal corresponding to the extracted peak signal is deleted with the peak signal related to the interference beam (n) stored in the RAM (or an interference beam between the reference beam (1) and the reference beam (n)). As a result, the extraction unit 102 extracts the signal measured using the interference beam (n).

In this manner, the extraction unit 102 extracts the signals related to the respective interference beams from the measurement signal.

In the present embodiment, the extraction unit 102 generates an image of a measurement target from a signal extracted for each interference beam by a known method.

The deriving unit 103 according to the present embodiment obtains a difference between the reference arm (1) and the reference arm (n) (distance between the zero point of the reference arm (1) and the zero point of the reference arm (n) in the sample arm) on the basis of a signal measured using the interference beam (n) extracted by the extraction unit 102 by the method similar to that of the first embodiment.

The display control unit 104 according to the present embodiment causes the display unit 16 to display an image generated by the extraction unit 102 so as to have a positional relationship in accordance with the positional relationship of the subject, similarly to the first embodiment.

As described above, with the configuration of the present embodiment, the FD-OCT device 1 can extract signals related to the respective interference beams by using different $\varphi_{dispersion\_n}$ for each interference beam, and can measure three or more different positions together.

In the present embodiment, wavelength dispersion characteristics are made different for three or more reference arms, so that the corresponding wavelength dispersion characteristic difference between the reference arm and the sample arm is made different for each of the interference beams (1) to (X). However, there may be a configuration in which three or more sample arms are provided and wavelength dispersion characteristics for each of the sample arms are made different, so that the corresponding wavelength dispersion characteristic difference between the reference arm and the sample arm is made different for each of the interference beams (1) to (X).

(5) Other Embodiments

The above embodiments are each an example for carrying out the present disclosure, and various other embodiments can be adopted. Therefore, at least some of the configurations of the above-described embodiments may be omitted or replaced. In addition, there may be a configuration in which the above-described embodiments may be combined as appropriate. Furthermore, at least a part of the functions of the acquisition unit 101, the extraction unit 102, the deriving unit 103, or the display control unit 104 may be implemented in a signal processing device (for example, a computer incorporated in the FD-OCT device 1, a computer connected to the FD-OCT device 1, or the like) different from the FD-OCT device 1.

In each of the above embodiments, the wavelength dispersion member is not provided and the wavelength dispersion is not generated in an optical path in which the wavelength dispersion characteristic is not different out of the sample arm and the reference arm. However, the wavelength dispersion (hereinafter, the magnitude of the wavelength dispersion is $\varphi_d$) may be generated in the optical path in which the wavelength dispersion characteristic is not different out of the sample arm and the reference arm by providing the same wavelength dispersion member in each of the optical paths, for example. In this case, the PD-OCT device 1 does not necessarily ignore either the positive frequency band or the negative frequency band for the measurement signal. The extraction unit 102 can perform measurement in a full range also for the interference beam B (interference beam (1)) by correcting the wavelength dispersion of $\varphi_d$ for the signal related to the extracted interference beam B (in the fourth embodiment, interference beam (1)), and removing the mirror signal by the same method as DEFR on the basis of the signals before and after the correction In the second embodiment described above, a lens focusing near the position of the measurement target corresponding to each of the sample arms is provided. However, in any of the embodiments, at least a part of the sample arm may be provided with a lens focusing near the position of the measurement target.

In each of the above embodiments, the wavelength dispersion member is not provided and the wavelength dispersion is not generated in one optical path in which the wavelength dispersion characteristic is different out of the sample arm and the reference arm. However, wavelength dispersion (hereinafter, the magnitude of the wavelength dispersion is $\varphi_{dis}$) may be generated in the optical path by being provided with a wavelength dispersion member in this optical path, for example. In this case, the FD-OCT device 1 does not necessarily ignore either the positive frequency band or the negative frequency band for the measurement signal. For the interference beam B ((in the fourth embodiment, interference beam (1)) extracted by the extraction unit 102, by correcting the wavelength dispersion of $\varphi_{dis}$ and removing the mirror signal by the same method as DEFR on the basis of the signals before and after the correction, measurement of the interference beam B (interference beam (1)) can be performed in a full range.

In each of the above-described embodiment, the wavelength dispersion member is provided in one of the reference arm and the sample arm, so that the corresponding wavelength dispersion characteristic difference between the reference arm and the sample arm is made different for each of a plurality of interference beams related to measurement. However, other modes may be adopted as long as the corresponding wavelength dispersion characteristic difference between the reference arm and the sample arm can be made different for each of the plurality of interference beams related to the measurement. For example, a wavelength dispersion member may be provided in both the reference arm and the sample arm.

In addition, in the above-described embodiments, the FD-OCT device 1 performs measurement by the SD-OCT method. However, the FD-OCT device 1 may be a device that performs measurement by another FD-OCT method such as a swept source (SS)-OCT method or the like.

In the above-described embodiments, the measurement target is the cornea and the retina of the eye to be examined. However, the measurement target may be another position such as another portion (a portion different from the corneal vertex in the cornea, an iris, a conjunctiva, and the like) of the eye to be examined.

In the above-described embodiments, the FD-OCT device 1 constitutes the Michelson interferometer as an interferometer to generate an interference beam. However, the FD-OCT device 1 may constitute another interferometer such as a balanced Michelson interferometer, a Mach-Zehnder interferometer, or the like.

Furthermore, the present disclosure is also applicable as a program and a method. For example, it is possible to provide a method and a program achieved by the device as described above. In addition, it can be changed as appropriate such that a part is software and a part is hardware. Furthermore, the disclosure is also established as a recording medium for a program. Of course, the recording medium for the software may be a magnetic recording medium or a semiconductor memory, and the same applies to any recording medium to be developed in the future.

What is claimed is:

1. An optical coherence tomography (OCT) device comprising:
    a light source;
    a light receiver;
    an optical system configured to form a sample arm that is an optical path in which light output from the light source travels toward a measurement target and travels from the measurement target toward the light receiver, and a reference arm that is an optical path different from the sample arm, the reference arm being an optical path in which light output from the light source travels toward the light receiver, wherein a plurality of interference beams in which a light beam that is output from the light source and traces the sample arm and a light beam that is output from the light source and traces the reference arm interfere with each other, the plurality of interference beams each having a different wavelength dispersion characteristic difference between the sample arm and the reference arm traced by the light beams interfering with each other; and
    a controller configured to:
        acquire an output signal output from the light receiver receiving the plurality of interference beams simultaneously and a correction signal obtained by applying wavelength dispersion correction processing to the output signal, and configured to repeat processing of extracting a maximum peak signal from the output signal and the correction signal and removing a signal corresponding to the peak signal from each of the output signal and the correction signal;
        extract a combined signal of the output signal after the peak signal is removed and the peak signal removed from the output signal as an extraction signal indicative of one of a plurality of the interference beams; and
        extract a combined signal of the correction signal after the peak signal is removed and the peak signal removed from said correction signal as an extraction signal indicative of the other one of a plurality of the interference beams.

2. The optical coherence tomography device according to claim 1, wherein
    the plurality of interference beams are light in which a plurality of light beams tracing a plurality of optical paths that are the reference arm and a light beam tracing the sample arm interfere with each other.

3. The optical coherence tomography device according to claim 1, wherein
    the plurality of interference beams are light in which a plurality of light beams tracing a plurality of optical paths that are the sample arm and a light beam tracing the reference arm interfere with each other.

4. The optical coherence tomography device according to claim 1, wherein
    the plurality of interference beams are light in which light beams tracing the sample arms that are different from each other and light beams tracing the reference arms that are different from each other interfere with each other.

5. The optical coherence tomography device according to claim 2, wherein
    the controller is configured to acquire the output signal output from the single light receiver that is configured to receive the plurality of interference beams and an interference reference beam in which a light beam tracing a first optical path out of the reference arms and a light beam tracing a second optical path that is different from the first optical path out of the reference arms interfere with each other,
    the controller is configured to further extract the signal of the interference reference beam on the basis of the output signal and the correction signal, and
    the controller is further configured to derive a distance corresponding to the frequency of the peak of the signal of the interference reference beam as the difference between an optical path length of the first optical path and an optical path length of the second optical path.

6. The optical coherence tomography device according to claim 1, wherein
    a plurality of light beams correspondingly tracing a plurality of optical paths as the sample arms are focused at different positions.

7. The optical coherence tomography device according to claim 1, wherein
    a plurality of light beams correspondingly tracing a plurality of optical paths as the sample arms pass through different optical axes to travel toward the measurement target.

8. The optical coherence tomography device according to claim 1, wherein
    the controller is further configured to cause a display to display a plurality of images generated for each of the interference beams on a basis of the extraction signal extracted for each of the interference beams.

9. The optical coherence tomography device according to claim 8, wherein the controller is further configured to cause the display to display each of the plurality of images such that the images have a positional relationship in accordance with the positional relationship of a subject of the plurality of images.

10. The optical coherence tomography device according to claim 9, wherein
in a case where there is an overlap in the plurality of images, the controller is configured to cause display the images in an overlapping manner for overlapping portions.

11. The optical coherence tomography device according to claim 5, wherein
the controller is further configured to cause a display to display a plurality of images generated for each of the interference beams on a basis of the extraction signal extracted for each of the interference beams,
wherein the controller is configured to cause the display to display the image corresponding to the interference beam including a light beam tracing the first optical path and the image corresponding to the interference beam including a light beam tracing the second optical path, such that the images have a positional relationship in which the images are separated from each other for a distance in accordance with the difference, and in a case where there is an overlap in the plurality of images, display the images in an overlapping manner for overlapping portions.

12. The optical coherence tomography device according to claim 3, wherein
a plurality of light beams correspondingly tracing a plurality of optical paths as the sample arms are focused at different positions.

13. The optical coherence tomography device according to claim 3, wherein
a plurality of light beams correspondingly tracing a plurality of optical paths as the sample arms pass through different optical axes to travel toward the measurement target.

14. The optical coherence tomography device according to claim 2, wherein
the controller is further configured to cause a display to display a plurality of images generated for each of the interference beams on a basis of the extraction signal extracted for each of the interference beams.

15. A signal processing method that is executed by an optical coherence tomography (OCT) device including a light source, a light receiver, and an optical system configured to form a sample arm that is an optical path in which light output from the light source travels toward a measurement target and travels from the measurement target toward the light receiver, and a reference arm that is an optical path different from the sample arm, the reference arm being an optical path in which light output from the light source travels toward the light receiver, the signal processing method comprising:
outputting from the light source a plurality of interference beams in which a light beam that is output from the light source and traces the sample arm and a light beam that is output from the light source and traces the reference arm interfere with each other, the plurality of interference beams each having a different wavelength dispersion characteristic difference between the sample arm and the reference arm traced by the light beams interfering with each other;
acquiring an output signal output from the light receiver receiving the plurality of interference beams simultaneously and a correction signal obtained by applying wavelength dispersion correction processing to the output signal and repeating processing of extracting a maximum peak signal from the output signal and the correction signal and removing a signal corresponding to the peak signal from each of the output signal and the correction signal;
extracting a combined signal of the output signal after the peak signal is removed and the peak signal removed from the output signal as an extraction signal indicative of one of a plurality of the interference beams; and
extracting a combined signal of the correction signal after the peak signal is removed and the peak signal removed from said correction signal as an extraction signal indicative of the other one of a plurality of the interference beams.

16. A non-transitory computer readable medium storing a program that causes an optical coherence tomography (OCT) device, the OCT device including a light source, a light receiver, and an optical system configured to form a sample arm that is an optical path in which light output from the light source travels toward a measurement target and travels from the measurement target toward the light receiver, and a reference arm that is an optical path different from the sample arm, the reference arm being an optical path in which light output from the light source travels toward the light receiver, to execute a signal processing method comprising:
outputting from the light source a plurality of interference beams in which a light beam that is output from the light source and traces the sample arm and a light beam that is output from the light source and traces the reference arm interfere with each other, the plurality of interference beams each having a different wavelength dispersion characteristic difference between the sample arm and the reference arm traced by the light beams interfering with each other;
acquiring an output signal output from the light receiver receiving the plurality of interference beams simultaneously and a correction signal obtained by applying wavelength dispersion correction processing to the output signal and repeating processing of extracting a maximum peak signal from the output signal and the correction signal and removing a signal corresponding to the peak signal from each of the output signal and the correction signal;
extracting a combined signal of the output signal after the peak signal is removed and the peak signal removed from the output signal as an extraction signal indicative of one of a plurality of the interference beams; and
extracting a combined signal of the correction signal after the peak signal is removed and the peak signal removed from said correction signal as an extraction signal indicative of the other one of a plurality of the interference beams.

* * * * *